United States Patent [19]

Shimoda

[11] Patent Number: 5,642,460
[45] Date of Patent: Jun. 24, 1997

[54] HIGH EFFICIENCY CODING RECORDING AND REPRODUCING APPARATUS

[75] Inventor: Kenji Shimoda, Kanagawa-ken, Japan

[73] Assignee: Kabushiki Kaisha Toshiba, Kawasaki, Japan

[21] Appl. No.: 280,246

[22] Filed: Jul. 25, 1994

Related U.S. Application Data

[63] Continuation of Ser. No. 856,770, Mar. 24, 1992, abandoned.

[30] Foreign Application Priority Data

Mar. 27, 1991 [JP] Japan ..................... 3-063566

[51] Int. Cl.$^6$ .................................................. H04N 5/92
[52] U.S. Cl. ............................................. 386/124; 386/68
[58] Field of Search ........................... 358/335, 310, 358/312; 360/33.1, 10.1, 32; 348/403, 420; 386/1, 6, 33, 34, 37, 46, 68, 109, 116, 123, 124, 111; H04N 5/92

[56] References Cited

U.S. PATENT DOCUMENTS

| | | | |
|---|---|---|---|
| 4,920,426 | 4/1990 | Hatori et al. | 358/133 |
| 4,920,476 | 4/1990 | Hatori et al. | 358/133 |
| 4,931,879 | 6/1990 | Koga et al. | 358/335 |
| 4,942,465 | 7/1990 | Ohta . | |
| 5,023,710 | 6/1991 | Kondo et al. | 358/335 |
| 5,060,077 | 10/1991 | Koya et al. | 358/310 |
| 5,068,744 | 11/1991 | Ito | 358/310 |
| 5,136,391 | 8/1992 | Minami | 358/310 |
| 5,140,437 | 8/1992 | Yonemitsu et al. | 358/342 |

FOREIGN PATENT DOCUMENTS

| | | |
|---|---|---|
| 0396285 | 11/1990 | European Pat. Off. . |
| 9102430 | 2/1991 | WIPO . |

OTHER PUBLICATIONS

C. Yamamitsu et al., "An Experimental Study for a Home-Use Digital VTR", IEEE Transactions on Consumer Electronics, vol. 35, No. 3, (1989) pp. 450–457.

MPEG (ISO–IEC/JTC1/SC2/WG11) Video Simulation Model Three (SM3) MPEG Doc 90/041 (1990).

Japanese Patent Disclosure (Kokai) No. H2-301066; J. Yonemitsu; May 16, 1989.

Primary Examiner—Thai Tran
Assistant Examiner—Huy Nguyen
Attorney, Agent, or Firm—Cushman Darby Cushman, Intellectual Property Group of Pillsbury, Madison & Sutro, L.L.P.

[57] ABSTRACT

A digital image signal is coded into an intra-picture component I, a forward predictively component P, and a bidirectionally predictively component B. These components are then time divisionally multiplexed. A process flag is attached to the intra-picture component to identify it, and then recorded. The recorded tape is scanned during reproduction so as to read the coded data at either a normal operating speed or a higher operating speed (equal to the normal operating speed multiplied by a speed multiplying coefficient). During reproduction, when the process flag is detected, the speed at which reproduction occurs is adjusted so as to assure that at least the intra-picture component of the image signal will be accurately reproduced. The reproduced data can then be output in a fixed period in correspondence to the speed multiplying number that determines the current operating speed of the apparatus. In a second embodiment, a digital image signal comprising coded data is separated into low and high region components, which time divisionally are multiplexed together and recorded onto magnetic tape. During recording, the coded data is arranged in units corresponding to image planes of the signal, with each image plane being recorded at an allocated position on the tape. An arranging means further assures that the low region components are recorded in a one-to-one correspondence with each of the units of the signal corresponding to an image plane.

11 Claims, 26 Drawing Sheets

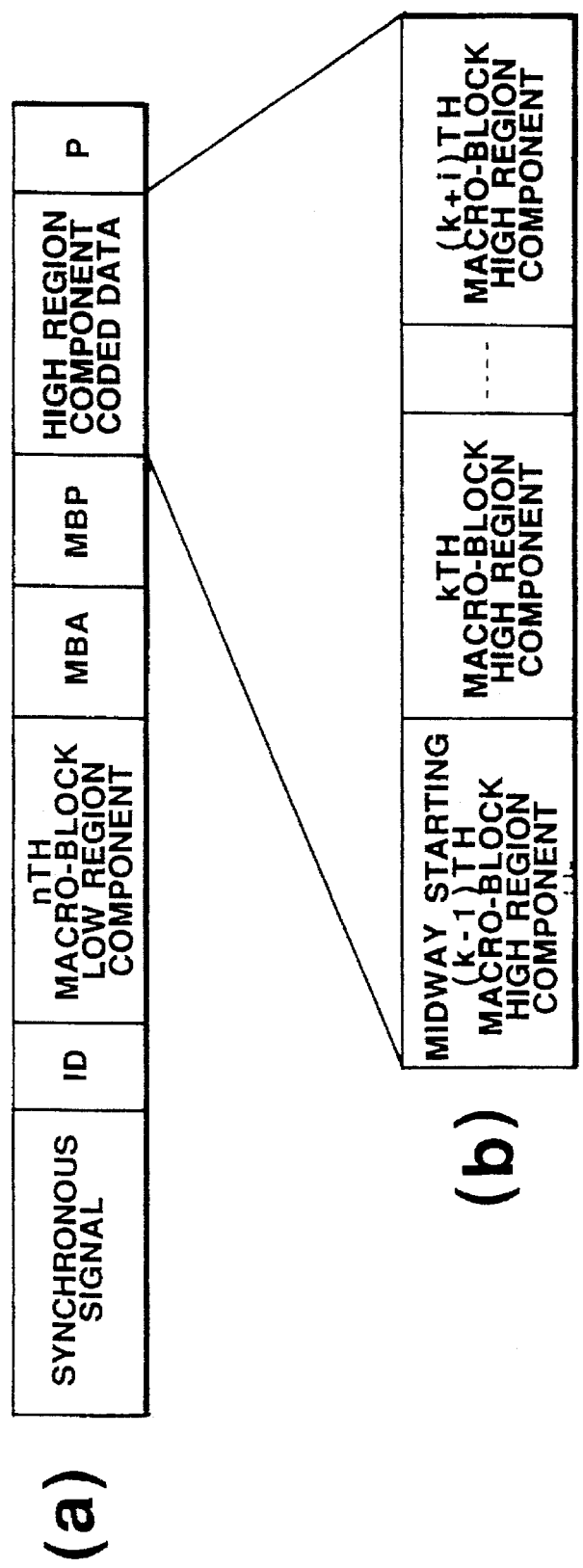

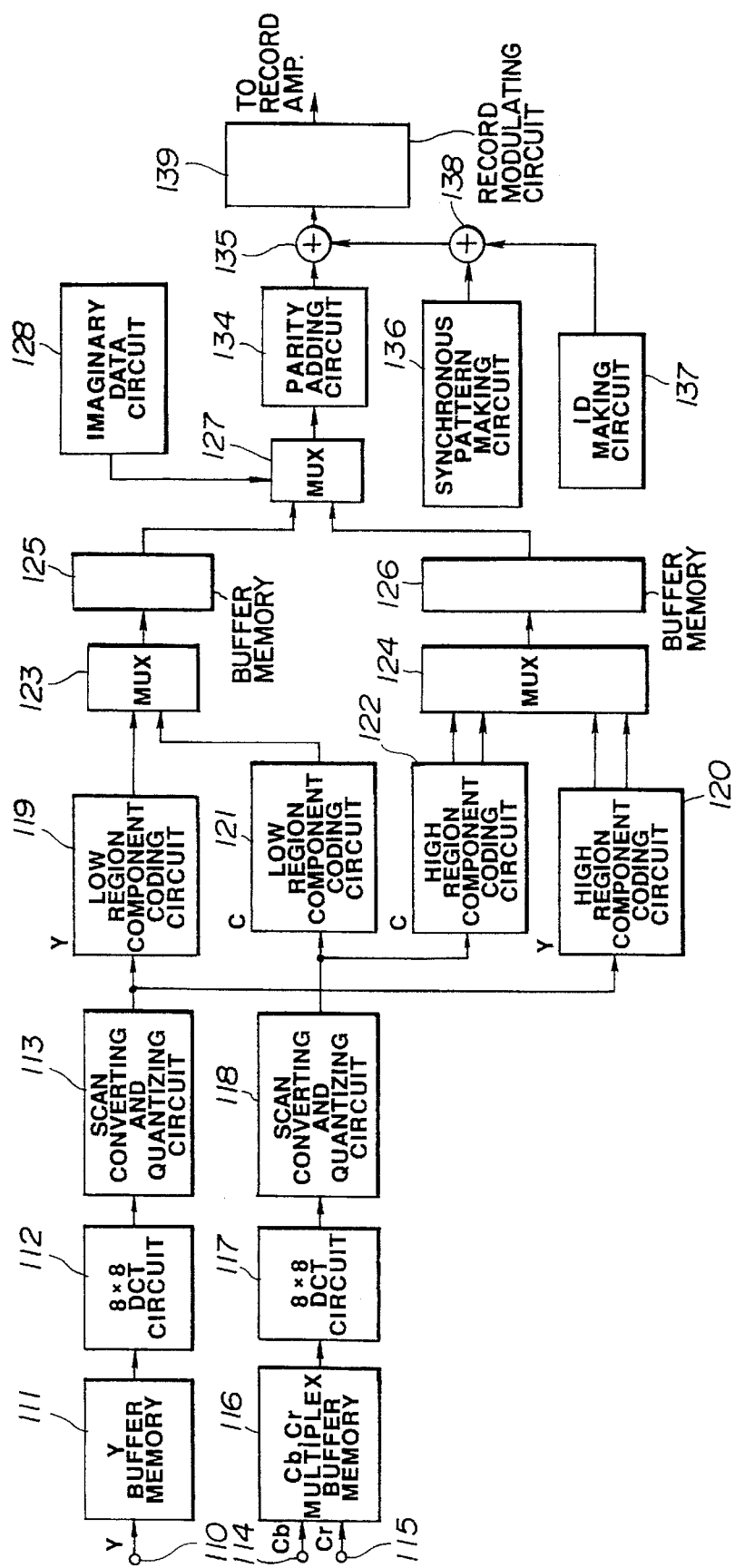

FIG.6

| Y0n | Y1n+1 | Cbn | Crn+1 |

FIG. 7

| Y0n+1 | Y1n | Cbn+1 | Crn |

FIG. 8

| SYNCHRONOUS SIGNAL | ID | nTH MACRO-BLOCK LOW REGION COMPONENT | PART OF (n+1)TH MACRO-BLOCK LOW REGION COMPONENT | MBA | MBP | HIGH REGION COMPONENT CODED DATA | P |

FIG. 9

| SYNCHRONOUS SIGNAL | ID | PART OF (m-1)TH MACRO-BLOCK LOW REGION COMPONENT | mTH MACRO-BLOCK LOW REGION COMPONENT | MBA | MBP | HIGH REGION COMPONENT CODED DATA | P |

FIG. 10

| SYNCHRONOUS SIGNAL | ID | LOW REGION COMPONENT | P | MBA | MBP | HIGH REGION | P |

FIG. 11

| SYNCHRONOUS SIGNAL | ID | LOW REGION | MBA | MBP | HIGH REGION | P | LOW REGION | MBA | MBP | HIGH REGION | P |

FIG. 12

| SYNCHRONOUS SIGNAL | ID | LOW REGION | MBA | MBP | HIGH REGION | P | MBA | MBP | HIGH REGION | P |

ZIGZAG SCAN

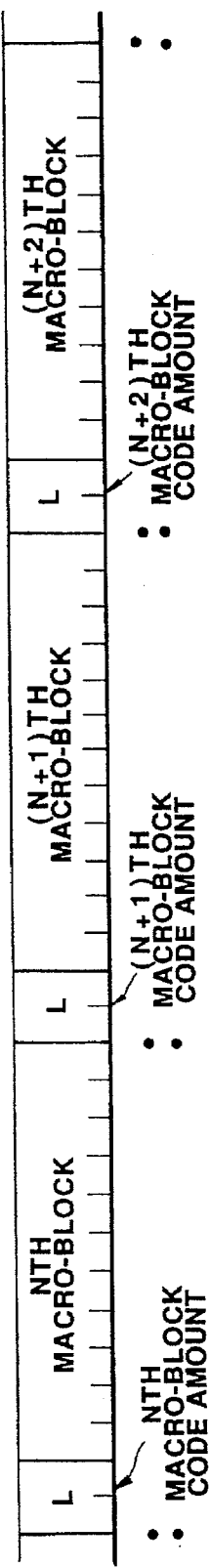
FIG. 37 (PRIOR ART)
FIG. 38 (PRIOR ART)
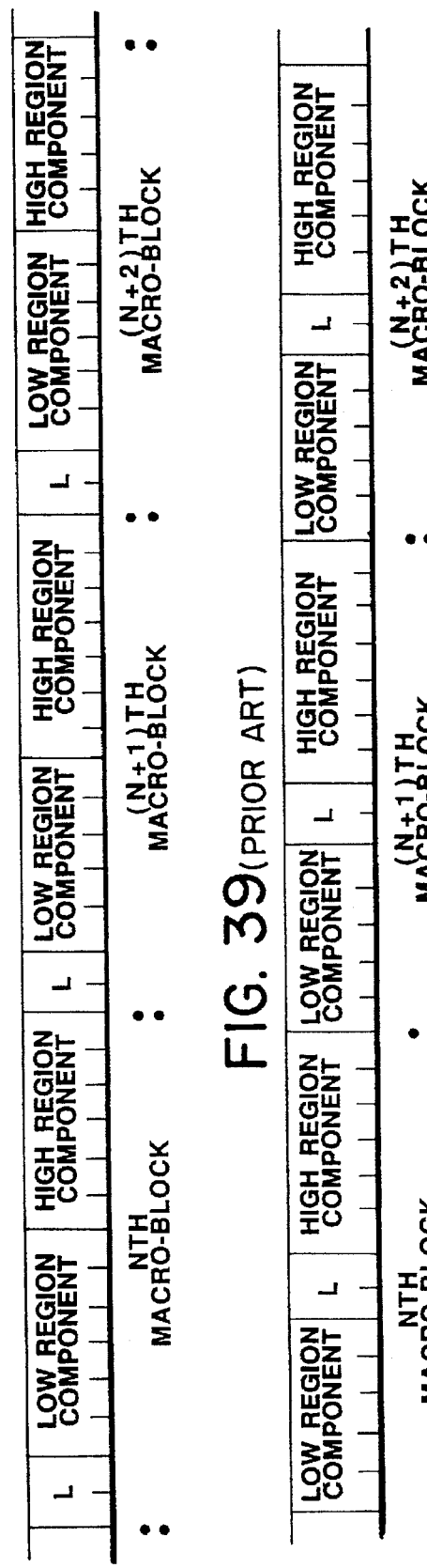
FIG. 39 (PRIOR ART)

FIG. 40
(PRIOR ART)

| SYNCHRONOUS SIGNAL ETC. | MBA | MBP | PICTURE CODING DATA SECTOR | P | MBA | MBP | PICTURE CODING DATA SECTOR | P |
|---|---|---|---|---|---|---|---|---|
| 6 BYTES | 3 BYTES | | 54 BYTES | 4 BYTES | 3 BYTES | | 54 BYTES | 4 BYTES |

FIG. 41
(PRIOR ART)

| MIDWAY STARTING (K-1)TH MACRO-BLOCK | KTH MACRO-BLOCK | --- | MIDWAY ENDING (K+I)TH MACRO-BLOCK |
|---|---|---|---|

N1 BYTE

HIGH EFFICIENCY CODING RECORDING AND REPRODUCING APPARATUS

This is a continuation of application Ser. No. 07/856,770, filed on Mar. 24, 1992, which was abandoned upon the filing hereof.

BACKGROUND OF THE INVENTION

1. Field of the Invention

This invention relates to recording and reproducing apparatus providing a high efficiency coding adapted for digital video tape recorders and digital audio tape recorders.

2. Related Art Statement

Recently, the digital processing of pictures has been investigated. Particularly, in the field of high efficiency coding for compressing picture data, various systems have been suggested as the standard. In order to improve the efficiency of the digital transmission and recording, a high efficiency coding technique is used to code picture data with a smaller bit rate. As a standard for high efficiency coding systems, the CCITT (International Telegraph and Telephone Consultative Committee) has suggested the JPEG (Joint Photographic Experts Group) system for color still pictures and the MPEG (Moving Picture Experts Group) system for moving pictures in the television conference/television telephone standardizing recommendation draft H.261 (as described in detail in "High Efficiency Picture Coding System Integrated" in the "Electronics" No. 511, Oct. 15, 1990 published by Japan Economic Journal Company). All of these suggestions are systems based on the DCT (Discrete Cosine Transform).

FIG. 20 is an explanatory diagram for explaining the MPEG encoding system. In the diagram, the predictive directions of the coding are shown by arrows. FIG. 25 is an explanatory diagram showing the order of the picture data in the coding process, the arrangement on the media and the decoding process in the MPEG coding system.

In the MPEG coding system, a GOP (Group of Pictures) is formed by a predetermined number of frame 5 and contains at least one intra-picture coded picture I. The intra-picture coded picture I is picture data of one frame as coded by the DCT. The picture data of each predetermined frame from the intra-picture coded picture I is converted to a forward predictive coded picture P by the forward predictive coding. Then, the picture data of each frame between the intra-picture coded picture I and the forward predictively coded picture P are converted to a bidirectional predictively coded picture B by the bidirectional predictive coding using the forward and rearward predictive coding.

As shown in FIG. 25, the intra-picture coded picture I is coded first by only the information within the frame and contains no prediction in the time direction. Then, as shown in FIG. 25, a forward predictively coded image P is made and a bidirectional predictively coded picture B is coded after the intra-picture coded picture I or the forward predictively coded picture P. The forward predictively coded picture P and bidirectional predictively coded picture B utilize a correlation with the other picture data. Thus, because of the predicting method of the respective picture data, the coded picture B is recorded on the medium after the coded pictures I and P, and is returned to its original order when decoded.

The intra-picture coded picture I is coded by only the information within the frame and therefore can be decoded by only the coded data alone. On the other hand, the forward predictively coded picture P and bidirectional predictively coded picture B are coded by utilizing a correlation with the other picture data and can not be decoded with only the coded data.

The circuit shown in FIG. 26 is adopted for the predictive coder and decoder and is mentioned in the "TV Picture Multidimensional Signal Process" (written by Keihiko Fukinuki and published by Daily Industrial Newspaper Company, pages 221-). FIG. 28 is a waveform diagram for explaining the predictive coding of a television signal.

In the television signal, the correlation between pixels is high making the difference between pixels small. The predictive coding utilizes such statistical property and sight characteristic (difference sensitivity). In the simplest front value prediction, a predictive value $xi'$ is determined by using the pixel $xi-1$ or one pixel before the present pixel, $xi$. Usually, a linear prediction is made by representing the predictive value $xi$ as $xi'=a\ xi-1$ (a represents a prediction coefficient). If the difference (prediction error) from the true value is represented by $\Sigma i$, it can be calculated by the below mentioned formula (1) and then coded. FIG. 26 shows the case where the prediction coefficient a is 1:

$$\Sigma i = xi - xi' = xi - a\ xi-1 \qquad (1).$$

That is to say, in FIG. 28, the video signal from the camera 42 is converted by the A/D converter 43 to a digital signal which is input into the subtractor 44 and delaying circuit 45. The signal input into the delaying circuit 45 is delayed by one pixel and is then multiplied by the prediction coefficient a in the multiplier 46 and is given to the subtractor 44. In the subtractor 44, the output of the multiplier 46 is subtracted from the output of the A/D converter 43 to determine $\Sigma i$ of the above mentioned formula (1). Then the output of the subtractor 44 is quantized by the non-linear quantizing circuit 47 and is output to the transmitting path 48. As the prediction error deviates in its distribution, as seen statistically, non-linear quantization is adopted in the coding.

On the other hand, the signal in the decoder from the transmitting path 48 is input into the typical value circuit 49. To reverse the compression characteristics of the non-linear quantizing circuit 47 of the coder, the typical value circuit 49 obtains the elongation characteristics by using the reverse of the function adopted in the non-linear quantizing circuit 47. The output of the typical value circuit 49 is given to the D/A converter and LPF (low pass filter) 51 through the adder 50, is converted to an analogue signal and is given to the delaying circuit 52. The output of the delaying circuit 52 is given to the adder 50 through the multiplier 53, which multiplies the signal by the prediction coefficient a. That is to say, the pixel $xi$ of the above mentioned formula (1) is obtained by the loop of the adder 50, delaying circuit 52 and multiplier 53. The output of the D/A converter and LPF 51 is given to the monitor 54 and is displayed.

By the way, in order to prevent the quantizing strains of the non-linear quantizing circuit 47 from accumulating in the coder, the circuit shown in FIG. 27 is adopted. That is to say, the local decoder 55 comprising the typical value circuit 49, adder 50, delaying circuit 52 and multiplier 53 is adopted to make a signal given to the subtractor 44. Thus, the quantizing strains will not be accumulated.

Now, the above described MPEG coding system is considered to be applied to the DAT (digital audio tape recorder) or VTR (video tape recorder). FIG. 29 is a traced pattern diagram showing the recorded tracks in this case by the track pattern coordinate method. In the diagram, the hatched parts show the recording positions of the intra-picture coded pictures I.

In the MPEG coding system, the data of the coded pictures I shown by the hatches recorded on the recording medium. Then, the data of the bidirectional predictively coded pictures B and forward predictively coded pictures P are successively and repeatedly recorded. In FIG. 29, the first GOP is recorded until the midway of the fourth track. The next GOP is recorded from the midway of the fourth track to the last of the sixth track. The coded picture I of the picture at the top of the next GOP is recorded at the top of the seventh track.

In the MPEG coding system, the recording rate is regulated (typ. 1.2 Mbps) but the data length is variable. Therefore, as shown in FIG. 29, the position of the track in which the intra-picture coded picture I is recorded can not be specified and the data length of 1 GOP can not be also specified.

Even in this usual reproduction, the respective coded pictures I, B and P are successively reproduced, and therefore there is particularly no problem. However, at the time of special reproductions such as the quick feed reproduction, only a part of the recorded track will be reproduced, therefore the recording position of the intra-picture coded picture I on the recording medium will not be regularly arranged and the intra-picture coded picture I may not be reproduced. Even in cases where the other coded data is positively reproduced, this data will not be able to be decoded.

In a moving picture coding system, there is a method wherein only the intra-picture coding is adopted instead of the above described MPEG system. FIG. 30 is a block diagram showing a related art of a high efficiency coding recording and reproducing apparatus suggested in "An Experimental Study for a Home-Use Digital VTR" (IEEE Vol. 35. No. 3, August (1989).

In FIG. 30, a luminance signal Y of a video signal is sampled with a sampling clock, for example, at a frequency of 13.5 MH$_z$ and color difference signals Cr and Cb are sampled with a sampling clock, for example, at a frequency of 13.5/4 MH$_z$. These signals Y, Cr and Cb are input into the memory 1 which converts the input interlaced signals to a frame structure and outputs horizontal and vertical direction 8×8 pixels as one block in a block unit to the bit rate reducing circuit 2.

FIG. 31 is a block diagram showing the bit rate reducing circuit 2.

In the DCT circuit 3 of the bit rate reducing circuit 2, a signal in which one block is formed of 8×8 pixels is input and converted to a frequency component by two-dimensional DCT (Discrete Cosine Transforming) processing of the 8×8 pixels. Thereby, the spatial correlative component can be reduced. That is to say, the output of the DCT circuit 3 is given to the adapted quantizing circuit 5 through the buffer memory 4 and is re-quantized by the adapted quantizing circuit 5 so that the redundancy of one block of the signal will be reduced. In this case, the data amount evaluating circuit 7 evaluates the amount of data the DCT circuit 3 and generates the coefficient based on the evaluated result. In the adapted quantizing circuit 5, the quantization is made on the basis of this coefficient.

The quantized data is then given to the variable length coding circuit 6 and is, for example, Haffman-coded on the basis of the result calculated from the statistical coded amount of the quantized output. Thereby, short bits are allotted to data having a high probability of appearing and long bits are allotted to data low in of probability appearing so that the transmitted amount will be further reduced. Thus, the data of 162 Mbps are compressed to 19 Mbps and is given to the coder 8 in FIG. 30.

In the coder 8, the parity for correcting errors is added to the data and output to the channel coder 10. In the coder 8, the variable length data of respective blocks are synchronized with synchronous signal$_s$, converted to synchronous blocks of a fixed length, and output. In the channel coder 10, the output of the coder 8 and the voice signal from the voice processing circuit 9 are recorded and coded in response to the characteristics of the recording media, are given to the recording amplifier (R/A) 11 and are recorded in the medium 12. Thus, as shown in FIG. 32, the data of the respective blocks are converted to synchronous blocks of the same data length and are recorded.

At the time of reproduction, the signal reproduced from the recording medium 12 will be given to the detector 14 through the reproduction amplifier (H/A) 13. In the detector 14, the bit clock of the reproduced signal is detected, the recorded data are decoded, the TBC (Time Base Correction) process correcting the time axis or the like is made and then the data are output to the decoder 15, in which errors such as random errors and burst errors generated at the time of the recording and reproduction are corrected by correcting codes and given to the bit rate decoder 16. In the bit rate decoder 16, the variable length code from the decoder 15 is decoded, the reverse quantizing process and reverse DCT process are made and the original information is restored. In this case, a non-reversible compressing process will be made by the re-quantizing process and some strains will be generated. The data decoded by the bit rate decoder 16 are given to the memory 17, and are then output after being converted to be of the same format as the input. The voice signal from the detector 14 is voice-processed and is output by processing circuit 18.

Thus, the coded data will be recorded in a synchronous block unit of a fixed length at the time of the recording, with the picture and recording position corresponding to each other, with some special reproduction possible to some extent. However, a defect arises in that the compression efficiency is low.

Also, in the "Fixed Electronic Still Camera Rate Adapted Type DCT Coding System" suggested in the 1989 Telecommunication Society Spring Nation-wide General Meeting D-159 is disclosed an example that the recording is made by limiting the code amount in a unit recording time to a fixed range. FIG. 33 is a circuit diagram for explaining this suggestion.

A signal of one block of 8×8 pixels input through the input terminal 21 is DCT-processed by the DCT circuit 22 and is then given to the scan converting circuit 23. As shown in FIG. 29, the outputs (DCT conversion coefficients) of the DCT circuit 22 are arranged in the order from the low region components to the high region components in the horizontal and vertical directions. In the scan converting circuit 23, as the information concentrates in the low region components in the horizontal and vertical directions of the DCT conversion coefficients, the scan is made zigzag from the low region components toward the high region components in the horizontal and vertical directions to output the DCT conversion coefficients to the quantizing circuit 24. Note the number 0 in FIG. 34 shows a DC component (direct current component) and its value is an average value of all the conversion coefficients. The other parts are AC components.

On the other hand, a parameter α showing the information amount of the input image is input into the multiplier 26 through the input terminal 28. In the multiplier 26, the information of the basic quantizing coefficient preset for each frequency component of the DCT conversion coefficient is given from the Q table 27 and this information is multiplied by the parameter α and is output to the quantizing circuit 24 through the limiting circuit 25. In the quantizing circuit 24, the DCT conversion coefficient is quantized on the basis of the quantizing coefficient from the limiting circuit 25. That is to say, in the quantizing circuit 24, the quantization is corrected for each frequency component by the output of the limiting circuit 25 and the coding rate is controlled. Note that the minimum quantizing coefficient 25 is limited on the basis of the encoding efficiency and the data of the Q table 27.

A picture coding system has been suggested by the present applicant in the specification of Japanese Patent Application Laid Open No. 404811/1990. In that system the data appearing at the output terminal 30 in FIG. 33 are made to be of a fixed length. FIG. 35 is a block diagram for explaining this suggestion.

A signal of the macro-block shown in FIG. 36 is input into the input terminal 31. In case the sampling frequency is 4 $f_{sc}$ ($f_{sc}$ is a color sub-carrier frequency), the number of effective pixels of one frame picture will be approximately 768 horizontal pixels×488 vertical pixels. In the color difference signals Cr and Cb, the sampling rate in the horizontal direction is only 2 $f_{sc}$. Therefore, while two luminance blocks of 8×8 pixels are sampled in the color difference signals Cr and Cb, respectively only one block of 8×8 pixels will be sampled. A macro-block is formed of these four blocks. The data of this macro block are input into the DCT circuit 33 through the buffer memory 32, are DCT-processed and are further quantized by the quantizing circuit 34 to obtain the same quantized output as the quantized output in FIG. 33. As shown in FIG. 37, at the top of each macro-block are added code amount data L showing the code amount of the macro-block.

This quantized output is divided by frequency, the low region component coded by the low region coding circuit 35 and the high region component coded by the high region coding circuit 36. The coded data from the low region and high region coding circuits 35 and 36 are given to the multiplexer (mentioned as MUX hereinafter) 39 respectively through the buffer memories 37 and 38 and are time-divided and multiplexed. FIG. 38 and FIG. 39 are explanatory diagrams for explaining the multiplex method. In FIG. 38, the low region component and high region component are successively arranged following the code amount data L. In FIG. 39, the low region component is arranged before the code amount data L and the high region component is arranged after the code amount data L.

The output of the MUX 39 is given to the packing circuit 40 and is provided with a macro-block address (MBA) and macro-block pointer (MBP) in a synchronous block unit. FIG. 40 is an explanatory diagram showing this state. The macro-block address shows the position on the picture in the macro-block, that is to say, the order within one frame or one field, for example, added following the synchronous signal. The macro-block pointer is added following this macro-block address and then the code amount data L and macro-block of FIG. 37 are arranged in the picture coding data sector. The picture coding data sector is sectioned by a unit of 54 bytes. As shown in FIG. 41, the macro-block is started or ended in the midway of the picture coding data sector. The macro-block pointer shows the byte position of the picture coding data sector from which the macro-block is started. Thus, the coded data fixed in the length within the frame are output from the packing circuit 40.

Also note that in the format of FIG. 40, two data P of the C1 series (61, 57) of the Read Solomon codes (R.S. codes) are added as error correcting codes. As error correcting codes in the magnetic recording system, the Read Solomon codes are often used as adopted in the "Error Correcting Apparatus" in the publication of Japanese Patent Application Laid Open No. 3224/1979, D-1 digital VTR, D-2 digital VTR and DAT. For example, in the D-1 standard, the codes of the C1 series (64, 60) and C2 series (32, 30) are adopted, in the D-2 standard, the codes of the C1 series (93, 85) and C2 series (68, 64) are adopted and, in the DAT, the codes of the C1 series (32, 28) and C2 series (32, 26) are adopted.

FIG. 42 is an explanatory diagram for explaining the D-1 standard. FIG. 43 is an explanatory diagram showing the recorded state of recording tracks of a VTR.

In the C1 series of the D-1 standard, as shown in FIG. 42, four correcting codes p, q, r and s are allotted to 60 data. In the C2 series, two correcting codes P and Q are allotted to 30 data. As shown in FIG. 43, in one track of the VTR, a plurality of data of FIG. 42 are continuously recorded. By the way, in one synchronous block, n (n ≧ 1) codes of the C1 series are provided.

Thus, in this example, the quantized output is classified in each frequency component by the conversion coefficient and the low frequency component is arranged in the reference position of each macro-block. Further, the macro-block pointer and the macro-block address showing the position on the picture are each arranged in synchronous block having an integral number of synchronous informations. By adding the code amount data L, the gross code amount of the macro-block can be caught and fixed in length within the frame. By the macro-block address and macro-block pointer, each macro-block and the position on the picture can correspond to each other.

However, if information such as the macro-block address, macro-block pointer or code amount data L is lacking, the decoding will not be able to proceed. For example, if an error is generated in the code amount data L, not only will that macro-block be erroneous but also the following macro-block, and will not be correctable until the macro-block address and macro-block pointer of the next synchronous block reach the designated part. Also, the respective macro-blocks are variable length coded and this a problem as special reproduction such as the quick feed reproduction of a VTR is impossible.

OBJECT AND SUMMARY OF THE INVENTION

An object of the present invention is to provide a recording and reproducing apparatus with an improved coding efficiency. By using a variable length coding, even in case an error is generated in predetermined data, the return from the error will be easy and the reproduced picture quality is kept constant.

Another object of the present invention is to provide a recording and reproducing apparatus, with a high efficiency of coding wherein, at the time of such special reproduction as of a VTR, a decoded picture will be able to be positively obtained.

The high efficiency coding recording and reproducing apparatus according to the present invention comprises a recorded code arranging means fed with coded data in which intra-frame coded data and inter-frame coded data are time-divisionally multiplexed and outputting the intra-frame coded data with the addition of a flag showing that they are intra-frame coded data, a flag detecting means fed with reproduced data from a recording medium in which the coded data are recorded and detecting the flag, a decoding means switching the intra-frame decoding process or inter-frame decoding process on the basis of the output of the flag detecting means and decoding the reproduced data from the recording medium, a recording position presuming means presuming the recording position on the recording medium of the intra-frame coded data from the output of the flag detecting means, a reproducing speed designating means controlling the trace of the recording tracks of the recording medium on the basis of the data of the speed multiplying number at the time of the reproduction and the output of the recording position presuming means and an outputting means outputting the output of the decoding means at a period based on the data of the speed multiplying number, also comprises on the recording side a coding means converting in the frequency and coding the data of a predetermined block within one picture, a low region component coding means coding for a variable length the low region component of the conversion coefficient from the coding means, a high region component coding means coding for a variable length the high region component of the conversion coefficient from the coding means and a recorded signal arranging means multiplexing the outputs of the low region component and high region component coding means, outputting them in a unit of a synchronous block of each synchronous signal and outputting the output of the low region component coding means as arranged in a predetermined position of the synchronous block, further has a recording means recording the output of this recorded signal arranging means on the tracks of the predetermined recording medium so that the synchronous blocks may be arranged at fixed intervals, comprises on the reproducing side a reproducing means reproducing the data recorded on the recording medium at a predetermined speed multiplying number and outputting the reproduced data, a synchronizing and detecting means detecting a synchronous signal in each synchronous block when the reproduced data are given, a high region decoding means decoding the data of the high region component included in the reproduced data, a low region decoding means decoding the data of the low region component included in the reproduced data, an output order changing means changing the output order of the low region decoding means in outputting on the basis of the output of the synchronizing and detecting means and a decoding means decoding as converted in the reverse frequency the output of the high region decoding means and the output of the output order changing means and reproducing the picture, further has on the recording side a difference coding means coding the difference of the output of the low region component coding means and a recording means switching and selecting the output of this difference coding means or the output of the low region component coding means and recording it in a predetermined recording medium together with the output of the high region component coding means, comprises on the reproducing side a reproducing means reproducing the data recorded in the recording medium with a predetermined speed multiplying number and outputting the reproduced data, a selection instructing means making the recording means select the output of the low region component coding means at a predetermined timing based on the speed multiplying number at the time of the high speed reproduction of this reproducing means and making the recording means select the output of the difference coding means at another timing, a high region component decoding means decoding the high region component included in the reproduced data, a detecting means detecting whether the reproduced data are the data of the low region component coded in the difference or not, a difference decoding means decoding the low region component coded in the difference and included in the reproduced data on the basis of the output of this detecting means, a low region component decoding means decoding the low region component not coded in the difference and included in the reproduced data on the basis of the output of the detecting means, a track crossing detecting means detecting the timing of tracing across the tracks on the recording medium at the time of the high speed reproduction of the reproducing means and outputting the detected pulses and a tracking controlling means determining the optimum tracing position by the output of the detecting means of the timing of the detected pulses and regulating the tracking of the reproducing means in response to the data of the speed smultiplying number.

The other features and advantages of the present invention will become apparent enough with the following description.

BRIEF DESCRIPTION OF THE DRAWINGS

FIG. 3 is an explanatory diagram for explaining the operation of the embodiment in FIG. 1.

FIG. 4 is a block diagram showing another embodiment of the present invention.

FIG. 5 is an explanatory diagram showing a data format obtained by the embodiment in FIG. 4.

FIG. 6 and FIG. 7 are explanatory diagrams showing a data format obtained by the embodiment in FIG. 4.

FIG. 8 and FIG. 9 are an explanatory diagram showing a data format obtained by the embodiment in FIG. 4.

FIG. 10, FIG. 11 and FIG. 12 are an explanatory diagram showing a data format obtained by the embodiment in FIG. 4.

FIG. 37 is an explanatory diagram for explaining the data format of the conventional example in FIG. 35.

FIG. 38 and FIG. 39 are an explanatory diagrams for explaining the data format of the conventional example in FIG. 35.

FIG. 40 is an explanatory diagram for explaining the data format of the conventional example in FIG. 35.

FIG. 41 is an explanatory diagram for explaining the data format of the conventional example in FIG. 35.

DETAILED DESCRIPTION OF THE PREFERRED EMBODIMENTS

Figure 1:
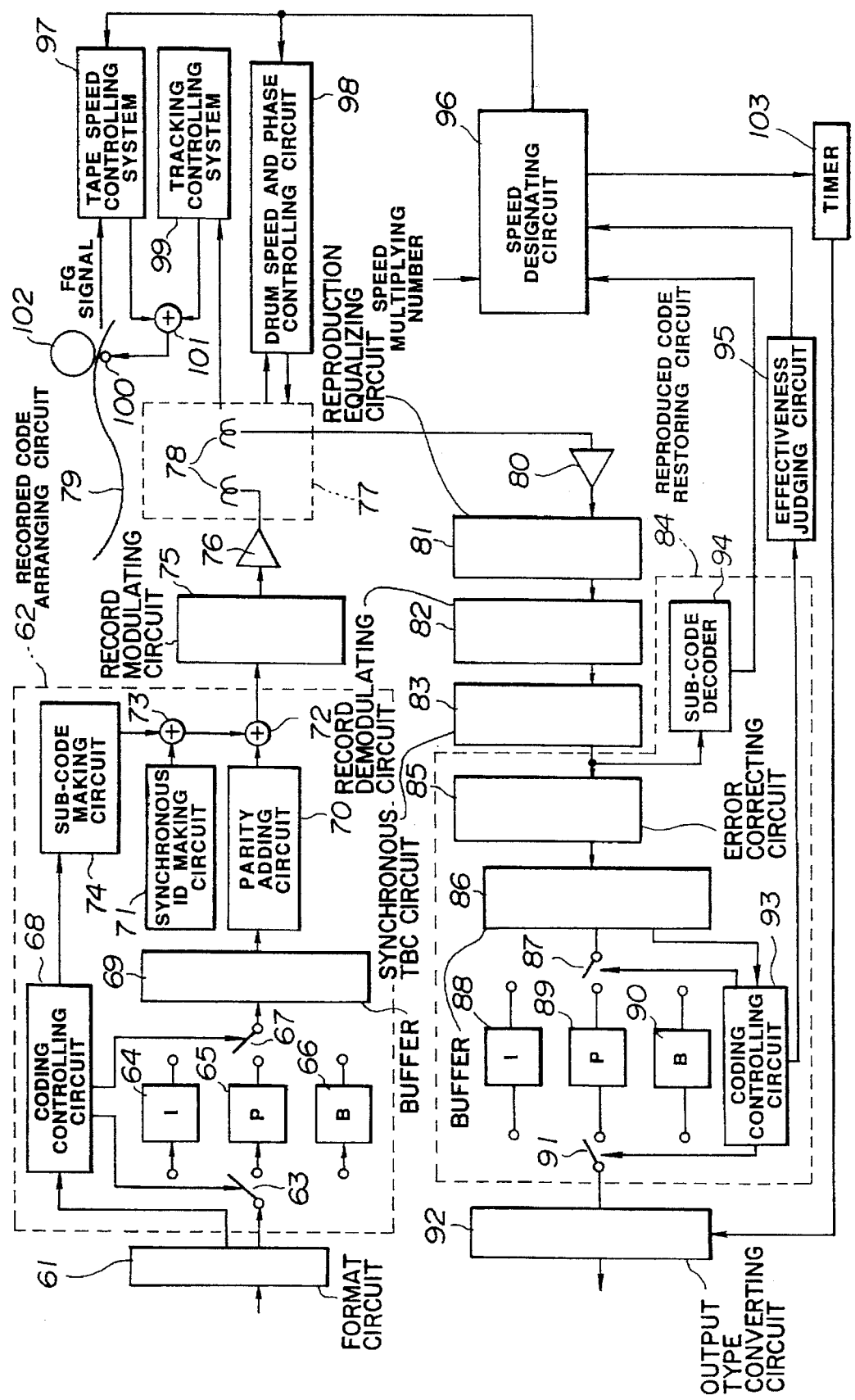
FIG. 1 is a block diagram showing an embodiment of the high efficiency coding recording and reproducing apparatus according to the present invention.

FIG. 1 is a block diagram showing one embodiment of the high efficiency coding recording and reproducing apparatus according to the present invention. In this embodiment, the present invention is applied to a video tape recorder.

An interlaced video signal is input into the format circuit 61 which has a memory, makes the input signal a frame, makes 8×8 pixels into one block and outputs data in said block unit. These data are given to the intra-picture coding circuit 64, forward predictively coding circuit 65 and bidirectionally predictively coding circuit 66 through the demultiplexer (mentioned as the DeMUX hereinafter) 63 in the recorded code arranging circuit 62 enclosed with the broken lines. These coding circuits 64, 65 and 66 make the intra-picture coding process I, forward predictively coding process P and bidirectionally predictively coding process B, respectively, and then output the coded data through the MUX 67. The coding controlling circuit 68 controls these DeMUX 63 and MUX 67 on the basis of the signal from the format circuit 61.

The high efficiency coded data from the MUX 67 are given to the parity adding circuit 70 through the buffer 69. The parity adding circuit 70 adds an error correcting parity to the input data and outputs them to the adder 72. On the other hand, the sub-code making circuit 74 makes sub-codes for various data and outputs them to the adder. If the coding controlling circuit 68 reveals that the output of the intra-picture coding circuit 64 is output, an I process flag showing that it is an intra-picture coding process I will be generated in the flag part of the sub-code included in the recording track in which this intra-picture coded picture I is recorded. Even if the corresponding recording track precedes the intra-Picture Coding Process in time, there will be a processing time delay in the parity adding circuit 70 and therefore the I process flat will be able to be described. The synchronous ID making circuit 71 outputs to the adder 73 the synchronous signal for taking the block synchronization and the ID number showing the block number or the like. The adder 73 adds the output of the sub-code making circuit 74 and the output of the synchronous ID making circuit 71 and gives them to the adder 72. The adder 72 adds the output of the adder 73 and the output of the parity adding circuit 70 and outputs them to the record modulating circuit 75.

The record modulating circuit 75 converts the input bit stream to be of a type adaptable to the recording medium and gives it to the video head 78 within the drum assembly 77 through the record amplifier 76. The video head 78 records the signal onto the magnetic tape 79 from the record amplifier 76, reproduces the recorded signal and gives it to the reproducing and equalizing circuit 81 through the reproduction amplifier 80.

The reproducing and equalizing circuit 81 removes the waveform interference (inter-code interference) from the input data and outputs the data to the record demodulating circuit. The record demodulating circuit 82 demodulates the data modulated at the time of recording, returns them to their original state and outputs them to the synchronous TBC circuit 83. The synchronous TBC circuit 83 corrects the time axis of the input data and gives the data to the error correcting circuit 85 within the reproduced code restoring circuit 84.

The error correcting circuit 85 corrects the error generated on the magnetic tape 79 and gives the data to the buffer 86. The output of the buffer 86 is given to the intra-picture decoding circuit 88, forward predictively decoding circuit 89 and bidirectionally predictively decoding circuit 90 through the DeMUX 87. These decoding circuits 88, 89 and 90 produce the intra-picture coded data, forward predictively coded data and bidirectionally predictively coded data and outputs the decoded data to the output type converting circuit 92 through the MUX 91. The output of the buffer 86 is given also to the coding controlling circuit 93 which judges the kind of the coding process from the input data row and controls the DeMUX 87 and MUX 91 on the basis of the judged result.

The output of the synchronous TBC circuit 83 is also given to the sub-code decoder 94 which detects the I process flag from the input data and gives the detected signal to the speed designating circuit 96. Also, the output from the coding controlling circuit 93 is also given to the effectiveness judging circuit 95 which judges whether there is an error in the reproduced data and gives the judged signal to the speed designating circuit 96. In the speed designating circuit 96, the speed multiplying number based on the user operation is designated and, on the basis of these speed multiplying number data, the detected signal from the sub-code decoder 94 and the judged signal from the effectiveness judging circuit 95, the speed designating signal for controlling the running speed of the magnetic tape 79 is output to the tape speed controlling system 97 and the drum speed and phase controlling system 98.

The tape speed controlling system 97 outputs to the adder 101 the signal designating the tape running speed on the basis of the FG (frequency) signal fed back from the capstan motor (not illustrated) driving the capstan 100. Also, the reproduced signal from the head 78 is given to the tracking controlling system 99 which outputs to the adder 101 the output for obtaining the optimum tracking position. The adder 101 adds the outputs of the tape speed controlling system 97 and tracking controlling system 99 and outputs the controlling signal to the capstan motor so that the rotating speed of the capstan 100 may be controlled and the transmitting speed of the magnetic tape 79 transmitted as held between the capstan 100 and pinch roller 102 may be regulated.

The speed designating circuit 96 gives the timer 103 the output based on the speed multiplying number. The timer 103 operates at a set period based on the speed multiplying number data and controls the reading out of the output type converting circuit 92 in each set period so that the output type converting circuit 92 may output the videodata from the MUX 91 at each predetermined time based on the speed multiplying number data.

Figure 2:
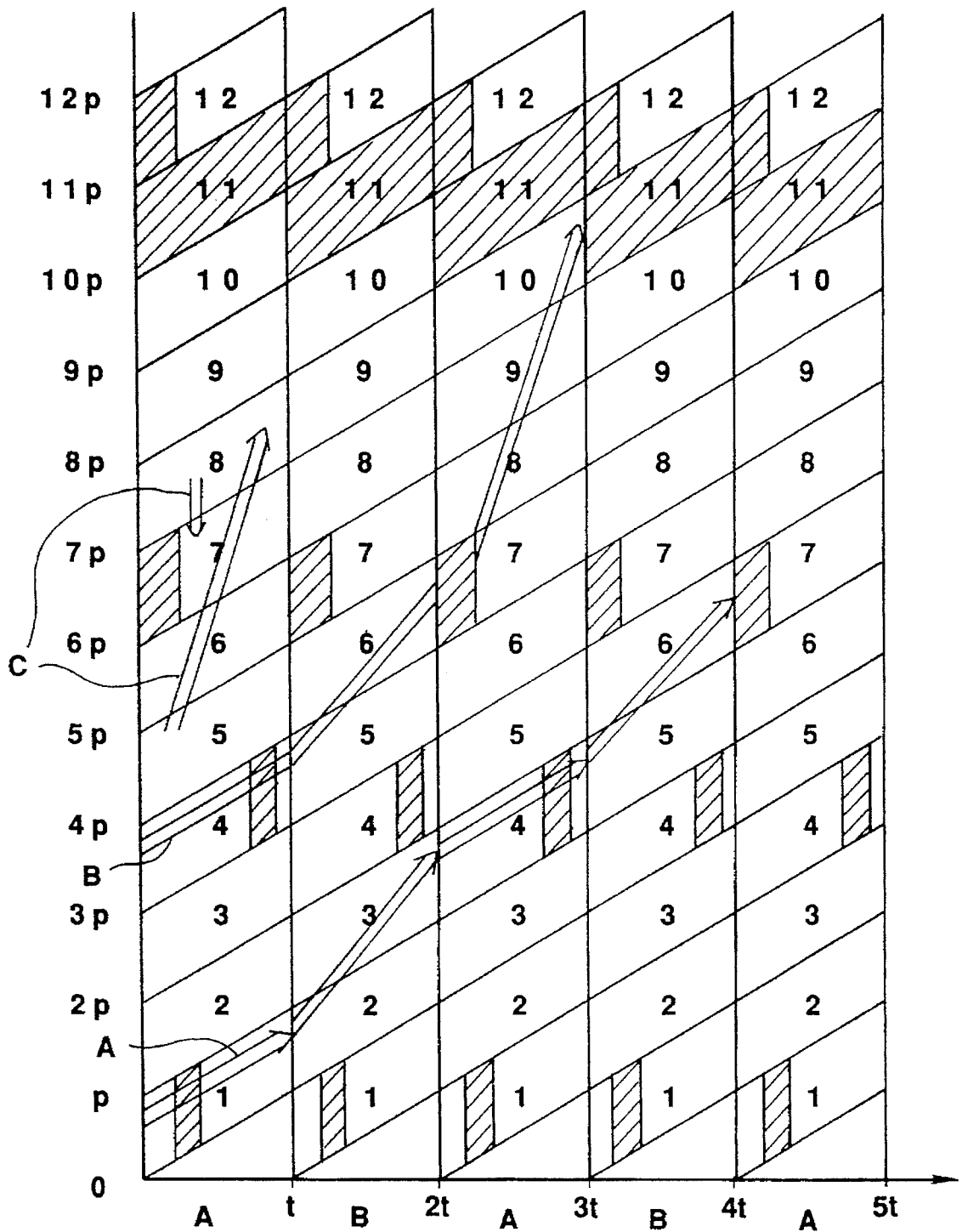
FIG. 2 is a tracing pattern diagram showing by a track pattern coordinate method the recorded tracks in the embodiment in FIG. 1.

The operation of the thus formed high efficiency coding recording and reproducing apparatus shall be explained in the following with reference to FIGS. 2 and 3. FIG. 2 is a tracing pattern diagram showing, by a track pattern coordinate method, the recording tracks in this embodiment. In the diagram, the hatched parts represent recording positions of intra-picture coded pictures I.

The input interlaced video signal is made into a frame by the format circuit 61 and is output to the DeMUX 63 in a block unit of 8×8 pixels. The data from the DeMUX 63 are given to the coding circuits 64, 65 and 66 and are subjected respectively to the intra-picture coding process I, forward predictively coding process P or bidirectionally predictively coding process B. The coding controlling circuit 68 controls the DeMUX 63, gives picture data to coding circuits 64, 65 and 66, controls the MUX 67 and outputs the coded data by a time division to make the MPEG coding. The variable length bit stream from the MUX 67 is output to the parity adding circuit 70 through the buffer 69 and an error correcting parity is added to it. A synchronous signal, ID signal and sub-code are also added to the bit stream by the adders 72 and 73.

In this embodiment, an I process which shows that an intra-picture coding is being processed by the sub-code making circuit 74, generated and is described in the flag part of the sub-code included with the recorded intra-picture coded data in the bit stream. Thus, in the bit stream from the adder 72, as shown in FIG. 3, the synchronous signal is arranged at the top, then, the ID number and sub-code are arranged and the I process flag is written into this sub-code. In the example in FIG. 3, the set of the coded data and parity is repeatedly arranged after the sub-code. The bit stream from the recorded code arranging circuit 62 is given to the record modulating circuit 75 and is converted so as to be adaptable to the recorded medium, is then given to the video head 78 through the record amplifier 76 and is magnetically recorded in the magnetic tape 79.

At the time of the reproduction, reproducing signal from the video head 78 will be input into the reproducing and equalizing circuit 81 which will equalize the input data and will remove the waveform interference. The data from the reproducing and equalizing circuit 81 are returned to the same data row as of the bit stream from the recorded code arranging circuit 62 by the record demodulating circuit 82 and synchronous TBC circuit 83 and are given to the reproduced code restoring circuit 84.

The sub-code decoder 94 detects the I process flag from the output of the synchronous TBC circuit 83 and outputs the detecting signal to the speed designating circuit 96. Also input is the judging signal from the effectiveness judging circuit 95 which shows whether there is an error or not. The speed designating circuit 96 controls the conveying speed of the magnetic tape 79 and the speed and phase of the drum on the basis of the speed multiplying number data and detected signal by the user operation.

Now, as shown by the hatched parts in FIG. 2, the intra-picture coded data are assumed to be recorded in the tracks Nos. 1, 4, 7, 11, 12, . . . After the track No.1 is traced, when, by the detecting signal of the sub-code decoder 94, the reproduction end of the intra-picture coded data in the track No.1 is caught from the reproduced data or the reproduction end of the intra-picture coded data in the track No.2 is caught, the speed designating circuit 96 will predict the periodicity of the intra-picture coded data and will designate a speed multiplying number or will designate a predetermined speed multiplying number to control the running of the magnetic tape 79 and, as shown in the trace A indicated by the arrow, by the speed multiplying reproduction, the video head 78 will be moved to the track No.4. Then, the track No.4 is traced to reproduce the intra-picture coded data. When the reproduction of the track No.4 ends, the speed designating circuit 96 will designate the speed multiplying reproduction again by the detecting signal of the sub-code decoder 94. When the sub-code decoder 94 detects the I process flag at the top of the track No.7, the ordinary reproduction will be returned and the track No.7 will be reproduced. Thus, the traces A and B shown by the arrows are made.

As shown by track No.7 of trace B, when it is shown by the detecting signal from the sub-code detector 94 that the reproduction of the intra-picture coded data has ended, the speed designating circuit 96 may move the speed multiplying reproduction to the track No.11 from the midway of the track. Further, as shown by the trace C of the arrows in the diagram, the speed designating circuit 96 may run the magnetic tape 79 in the reverse direction so that the sub-code decoder 94 may detect the I process flag.

Thus, by properly repeating the ordinary reproduction and quick feeding reproduction, the speed designating circuit 96 positively reproduces at least the intra-picture coded data. The reproduced signal is given to the reproduced code restoring circuit 84 through the reproducing and equalizing circuit 81, record demodulating circuit 82 and synchronous TBC circuit 83. The errors formed, at the time of recording and reproduction are corrected by the error correcting circuit 85 of the reproduced code restoring circuit 84 and given to the DeMUX 87 and coding controlling circuit 93 through the buffer 86. The coding controlling circuit 93 judges the kind of coding process input into the DeMUX 87 and controls the DeMUX 87. The output of the DeMUX 87 is given to the decoding circuits 88, 89 and 90, is decoded and is given to the output type converting circuit 92 through the MUX 91.

As described above, the speed designating circuit 96 properly repeats the ordinary reproduction and quick feeding reproduction and therefore the time axis of the reproduced data is not always constant. Therefore, the speed designating circuit 96 gives the data of the speed multiplying number to the timer 103 and controls the set period. A signal with a predetermined period corresponding to the speed multiplying number is given to the output type converting circuit 92 from the timer 103. This allows the output type converting circuit 92 to output the data at fixed intervals corresponding to the designated speed multiplying number, thereby allowing a reproduced picture favorable to the sight to be obtained.

Thus, due to the sub-code making circuit 74, of this embodiment the I process flag showing the intra-picture coded data is described and recorded within the sub-code and, at the time of the reproduction, this I process flag will be detected so that the speed designating circuit 96 may regulate the reproducing speed and may positively reproduce at least the intra-picture coded data. These intra-picture coded data can be decoded with only the data of one frame and, even if a special reproduction such as a speed multiplying reproduction is made, the reproduced data will still be able to be decoded. Further, by the signal from the timer 103, the output type converting circuit 92 outputs the decoded data at a fixed period in response to the designated speed multiplying number, allowing for a special reproduced picture natural to the sight to be obtained. FIG. 4 is a block diagram showing another embodiment of the high efficiency coding recording and reproducing apparatus according to the present invention. In this embodiment, only the intra-picture coding is adopted.

The luminance signal Y input through the input terminal 110 is given to the buffer memory 111 which outputs to the DCT circuit 112 the data in a block unit of 8×8 pixels. The DCT circuit 112 makes a two-dimensional process of 8×8 and outputs conversion coefficients to the scan converting and quantizing circuit 113 which successively zigzag scans the conversion coefficients, successively arranges them from the low region component and reduces the bit rate by quantization.

On the other hand, color difference signals Cb and Cr are input respectively into the input terminals 114 and 115 and are given to the buffer memory 116 which successively time-divides and multiplexes the color difference signals Cb, Cr, Cb, ... in a block unit of 8×8 pixels and outputs them. The output of the buffer memory 116 is given to the scan conversion quantizing circuit 118 through the DCT circuit 117. The formations of the DCT circuit 117 and scan conversion quantizing circuit 118 are respectively the same as the formations of the DCT 112 and scan conversion quantizing circuit 113.

The output of the scan conversion quantizing circuit 113 is given to the low region component coding circuit 119 and high region component coding circuit 120. The low region component coding circuit 119 codes the low region component of the conversion coefficient of the luminance signal Y. The high region component coding circuit 120 codes the high region component of the conversion coefficient of the luminance signal Y. The low region component coding circuit 121 codes the low region components of the color difference signals Cb and Cr from the scan converting and quantizing circuit 118. The high region component coding circuit 122 codes the high region components of the color difference signals Cb and Cr from the scan converting and quantizing circuit 118.

In this embodiment, the outputs of the low region component coding circuits 119 and 121 are given to the MUX 123. The outputs of the high region component coding circuits 120 and 122 are given to the MUX 124. The high region component coding circuits 120 and 122 output code length data showing data lengths together with the coding data. The MUX 124 multiplexes the coding data of the luminance signal Y and color difference signals Cb and Cr and outputs them to MUX 127 through the buffer memory 126. By the way, the same as heretofore, the macro-block address and macro-block pointer are added to the output of the buffer memory 126.

On the other hand, the MUX 123 multiplexes the low region components of the luminance signal Y and color difference signals Cr and Cb and outputs them to the MUX 127 through the buffer memory 125. The output of the imaginary data circuit 128 is also given to the MUX 127. The imaginary data circuit 128 outputs the imaginary data row, for example, of the logic "1" at a timing arranging the synchronous signal or ID signal, The MUX 127 arranges the low region component from the buffer memory 125 following, for example, this imaginary data row and then properly repeatedly arranges the high region component from the buffer memory 126.

The output of the MUX 127 is given to the parity adding circuit 134 which adds the parity in a predetermined position in the data row and outputs it to the adder 135. Also the synchronous pattern making circuit 136 makes a synchronous pattern and outputs it to the adder 138. The ID making circuit 137 makes an ID number and outputs it to the adder 138. The adder 138 adds two inputs and gives them to the adder 135. Thereby, the adder 135 adds the synchronous signal and ID number from the adder 138 instead of the imaginary data row arranged at the top of the data from the parity adding circuit 134. That is to say, when the imaginary data are substituted for the synchronous signal and ID number, the synchronous signal and ID number will be arranged at the top of each synchronous block and then the low region component of the macro-block will be arranged. The output of the adder 135 is given to the record modulating circuit 139 which makes the modulation in response to the recording medium and outputs it to a record amplifier not illustrated. By the way, for the convenience of the explanation, in FIG. 4, the fixed length making means for fixing the data is not illustrated.

The data format obtained by the coding of this embodiment shall be explained in the following with reference to the explanatory diagrams in FIGS. 5 to 8.

As shown in FIG. 5(a), at the top of the synchronous block is arranged the synchronous signal. After the synchronous signal is arranged the ID number showing the block number and the like. In the embodiment in FIG. 4, the imaginary data row is once arranged in the part of these synchronous signal and ID number and next the imaginary data row is arranged the low region component. The imaginary data row is substituted for the synchronous signal and the ID number showing the nth macro-block. As shown in FIG. 5(a), after the ID number are arranged the coded data of the low region component of the nth macro-block. Next are arranged the macro-block address MBA and macro-block pointer MBP and then the coded data of the high region component. The address and starting point of the macro-block to which belong the coded data of this high region component are shown by the macro-block address MBA and macro-block pointer MBP. After the coded data of the high region component is added the error correcting parity P.

As shown in FIG. 5(b), the coded data of the high region component are formed of the high region components of a plurality of macro-blocks. For example, in FIG. 5(b), at the top are arranged the high region component data of the (K-1)th macro-block from the midway, next are arranged the high region components of the (K−1)th to (K+i−1)th macro-blocks, and lastly arranged are the data of the high region component of the (K+i)th macro-block until the midway.

As these high region component data are variable length data, with only the ID number, the macro-block data can not be specified. For example, even if a predetermined ID number is added, the macro-block address showing the kth block, (k−1)th block or (k+i)th block will be described. On the other hand, on the low region component, the data of a predetermined number (one in FIG. 5(a)) of macro-blocks are arranged for each ID number. That is to say, in FIG. 5(a), the low region component of one macro-block is each allotted a synchronous block so that the macro-block to which belongs the low region component, may be specified by the ID number. If the low region component of a fixed number of macro-blocks is arranged following each ID number, the relation between the ID number and the number of the macro-blocks to which belongs the lower region component will be fixed. In order to record on the magnetic tape such format data, it is necessary to satisfy the condition of the below mentioned formula (2):

$$a1 \times (Nt \times Nsync) \geq b1 \times Nmacro \quad (2)$$

(wherein each of a1 and b1 represents a positive integer equal to or larger than 1). Here, Nmacro represents the total number of macro-blocks within one frame (or one field), Nt represents the number of recording tracks corresponding to the frame (or field) data and Nsync represents the number of blocks within one track.

Now, if Nt=4 tracks and Nmacro=2928, the formula (2) will become the below mentioned formula (3):

$$a1 \times Nsync \geq b1 \times 732 \quad (3)$$

As one solution of this formula (3), a1=1. Nsync=732 and b1=1 are considered. This means that the low region component of one macro-block may be recorded in one synchronous block. In such case, the ID number $N_{ID}$ and macro-block will correspond to each other at 1:1 and $N_{ID}$ = 1 → First macro-block,
$N_{ID}$ = 2 → Second macro-block,
.   .
.   .
.   .
$N_{ID}$ = i → ith macro-block will be made. That is to say, even in case the macro-block address MBA is not decoded, the macro-block will be able to be specified by the ID number $N_{ID}$.

FIG. 6 is an explanatory diagram showing a modification of the format in FIG. 5.

In this example, a micro-block is formed of two blocks Y0 and Y1 of the luminance signal and each block of the color difference signals Cb and Cr. In FIG. 6(a), the ID number $N_{ID}$ is n and the low region components of the nth macro-block and the low region components of the (n+1)th macro-block are arranged in the order of Y0n, Y1n+1, Cbn and Crn+1. In FIG. 7, the ID number $N_{ID}$ is (n+1) and the low region components of the (n+1)th macro-block and the low region components of the nth macro-block are arranged in the order of Y0n+1, Y1n, Cbn+1 and Crn. Thus, even in case an error is generated in the data of any ID number, the interpolation will be easy and the quality deterioration in the case of the repairing operation will be reduced.

FIG. 8 and FIG. 9 shows data formats in case a1=3, b1=2 and Nsync=488 are set for the solution of the formulae (2) and (3) in FIG. 5.

As 1.5 micro-blocks are arranged in one synchronous block, in case the ID number $N_{ID}$ is an odd number, as shown in FIG. 8, the data of half the low region components of the next macro-block will be arranged in the rear half of the region where the low region components of the macro-block arranged. In the same manner, in case the ID number $N_{ID}$ is an even number, as shown in FIG. 9, the data of half the low region components of the macro-block will be arranged in the front half. That is to say, $N_{ID}$ = 1 → First macro-block + front half
   of second macro-block,
$N_{ID}$ = 2 → Rear half of second macro-block +
   third macro-block,
$N_{ID}$ = 2i − 1 → (3i − 2)th macro-block + front half
   of (3i − 1)th macro-block and
$N_{ID}$ = 2i → rear half of (3i − 1)th macro-block +
   3ith macro-block will be made. Even in this case, the macro-block to which the arranged low region components belong will be able to be discriminated from the ID number even when the macro-block address is not decoded. By the way, the same as heretofore, it is needless to say that the high region component can be discriminated only by the macro-block address MBA.

FIGS. 10–12 are an explanatory diagram showing another format of the data obtained in this embodiment. In FIG. 10, following the synchronous signal and ID number of one synchronous block, the low region components are arranged in one place and then the error correcting parity P is added. In FIG. 11, the low region components are arranged in a correcting series unit. In FIG. 12, the parity P is added by changing the formation of the data in the front half and rear half.

Figure 13:
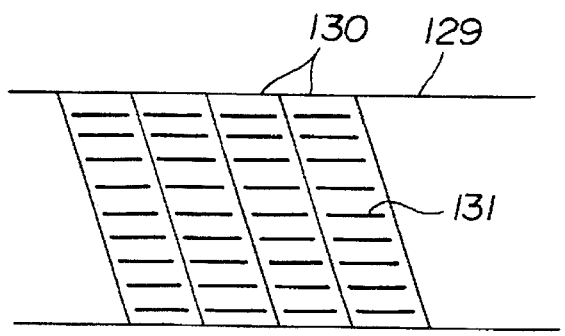
FIG. 13 is an explanatory diagram for explaining a recorded pattern of a magnetic tape of the embodiment in FIG. 4.
Figure 14:
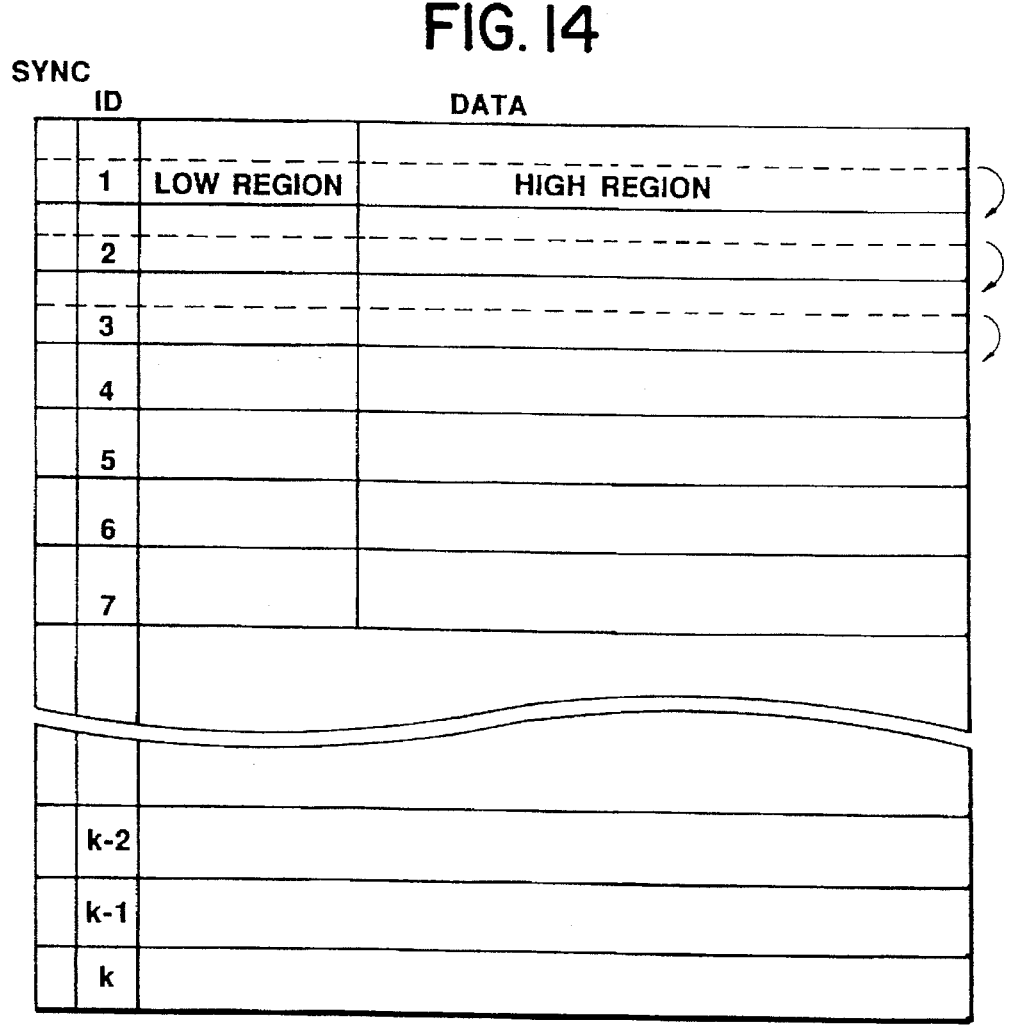
FIG. 14 is an explanatory diagram for explaining a recorded pattern of a magnetic tape of the embodiment in FIG. 4.

FIGS. 13 and 14 are explanatory diagrams showing magnetic tape recording patterns. As shown in FIG. 13, tracks 130 are formed in the magnetic tape 129. The synchronous signals 131 of the synchronous block are successively recorded at the same intervals in the respective tracks 130. Following the ID number of the synchronous block, the low region components are recorded. As shown in FIG. 14, the low region components are arranged at fixed intervals on the tracks of the magnetic tape.

The operation of the thus formed embodiment shall be explained in the following.

The luminance signal Y and color difference signals, Cb and Cr, are input respectively through the input terminals 110, 114 and 115 and are converted to block data of 8×8 respectively by the buffer memories 111 and 116 and are DCT-processed by the DCT circuits 112 and 117. The conversion coefficients from the DCT circuits 112 and 117 are zigzag scanned and quantized respectively by the scan converting and quantizing circuits 113 and 118. The outputs of the scan converting and quantizing circuits 113 and 118 are separately coded in the low region and high region respectively by the low region component coding circuits 119 and 121 and high region component coding circuits 120 and 122.

The low region components from the low region component coding circuits 119 and 121 are multiplexed by the MUX 123 and are given as the low region components of the macro-block to the MUX 127 through the buffer memory 125. On the other hand, the high region components from the high region component coding circuits 120 and 122 are multiplexed by the MUX 124 and are given as the high region components of the macro-block to the MUX 127 through the buffer memory 126. The MUX 127 is fed with imaginary data, corresponding to timing of the synchronous signal and ID number part from the imaginary data circuit 128, and arranges and outputs the low region components of the macro-block following these imaginary data. The parity adding circuit 134 adds the parity to the data row from the MUX 127. The adder 135 substitutes the synchronous signal and ID number for the imaginary data and outputs them so that the data of the format shown in FIGS. 5 to 12 may be given to the record modulating circuit 139 which gives the data to a record amplifier not illustrated and makes, for example, a magnetic tape record the data.

Figure 15:
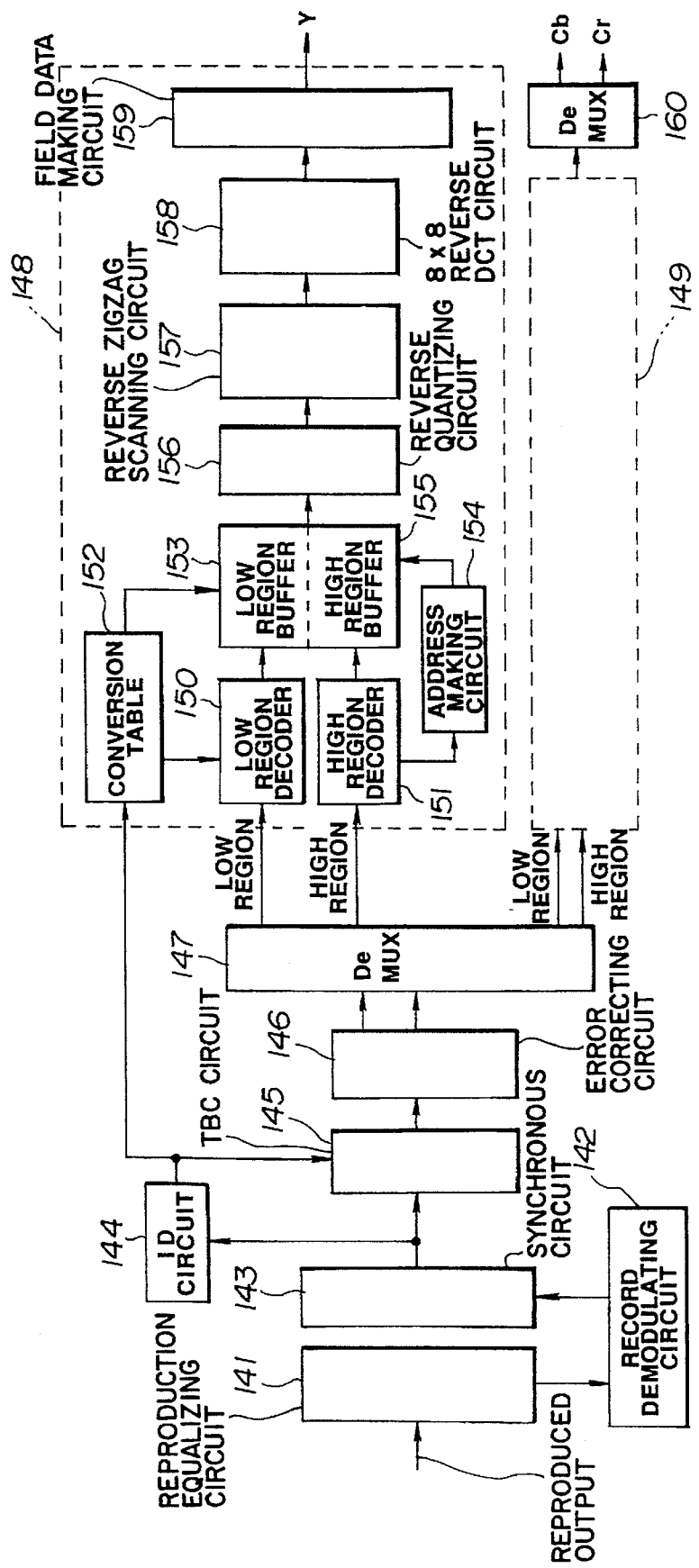
FIG. 15 is a block diagram showing another embodiment of the present invention.

An embodiment on the coded data on the decoding side is shown in FIG. 15.

The reproduced output of the coded data from a magnetic tape or the like is input into the reproducing and equalizing circuit 141 which equalizes the reproduced output and gives it to the record demodulating circuit 142. The record demodulating circuit 142 demodulates the modulated signal in response to the recording medium and gives the demodulated signal to the synchronous circuit 143 which extracts the synchronous signal and outputs it to the ID circuit 144 and TBC circuit 145. The ID circuit 144 extracts the ID number arranged just after the synchronous signal. The TBC circuit 145 corrects the time axis of the reproduced output by utilizing the ID number from the ID circuit 144 and outputs it to the error correcting circuit 146 which corrects the errors generated at the time of recording and reproducing and gives them to the DeMUX.

The DeMUX 147 divides the time-divisionally multiplexed data row into the low region component and high region component of the luminance signal Y and the low region components and high region components of the color difference signals Cr and Cb and gives them respectively to the low region decoder 150 and high region decoder 151 of the luminance signal processing system 148d and the low region decoder and high region decoder not illustrated of the color difference signal processing system 149. The high region decoder 151 decodes the data of the high region component of the luminance signal and gives them to the high region buffer 155 through the address making circuit 154 which makes address information from the macro-block address MBA and macro-block printer MBP included in the output of the high region decoder 151.

On the other hand, the conversion table 152 compares the ID number and macro-block address with each other by the output of the ID circuit 144, and outputs to the low region decoder 150 and low region buffer 153 the data showing the block number and macro-block address belonging to the low region component input into the low region decoder 150. The low region decoder 150 decodes the low region component of the luminance signal by utilizing the output of the conversion table 152 and makes the low region buffer 153 memorize it.

The outputs of the low region buffer 153 and high region buffer 155 are successively given to the reverse quantizing circuit 156, reverse zigzag scanning circuit 157 and reverse DCT circuit 158. These circuits 156, 157 and 158 are processed in reverse to the processes of the scan converting and quantizing circuit 113 and DCT circuit 112 at the time of recording. The output of the reverse DCT circuit 158 is given to the field data making circuit 159 which converts the framed data to an interlaced signal and outputs it.

On the other hand, the formation of the color difference signal processing system 149 is the same as of the luminance signal processing system 148 except that the color difference signals Cb and Cr are multiplexed and therefore shall not be illustrated here. The output of the color difference signal processing system 149 is given to the DeMUX 160 which separates the color difference signals Cb and Cr and outputs them.

The operation of the thus formed embodiment shall be explained with reference to FIGS. 12 and 13, which are trace pattern diagrams wherein the time variation for one scanning time t is taken on the abscissa, and the length of the tape corresponding to one track pitch or one track is taken on the ordinate (a track pattern coordinate method). FIG. 12 shows 3-time speed and 9-time speed reproductions. FIG. 13 shows -3-time speed and -9-time speed reproductions. The track width=track pitch of the video head is set. The track numbers are represented by a digit beginning with 1. The oddnumber represents a+azimuth track and the even number represents a–azimuth track. Only when the azimuth of the recording track and the azimuth of the reproducing head coincide with each other, will data be reproduced. The reproduced parts are shown by the hatches.

The reproduced output from the video head is given to the synchronous circuit 143 through the reproduction equalizing circuit 141 and record demodulating circuit 142 and is further processed by the TBC circuit 145 and error correcting circuit 146 to be returned to the coded data before the recording which are given to the DeMUX 147. On the other hand, the output of the synchronous circuit 143 is given also to the ID circuit 144. The synchronous signal and ID number are extracted by these circuits.

The DeMUX 147 separates the time-divisionally multiplexed coded data into the luminance signal Y and color difference signals Cb and Cr, separates them respectively into the low region component and high region component and outputs them. The high region component is decoded by the high region decoder 11. The macro-block address MBA and macro-block pointer MBP are extracted by the address making circuit 154 and are stored in the high region buffer 155. On the other hand, the low region component is decoded by the low region decoder 150. In this case, the low region component is compared with the macro-block number by the conversion table 152.

Now, as shown in the trace T3 in FIG. 12, the 3-time reproduction is assumed to be designated. At the time of the speed multipling reproduction, the video head will be traced obliquely. Therefore, as shown by the hatched parts of the trace T3, the recorded coded data can be reproduced only intermittently. Here, the coded data for one field are assumed to be recorded in four tracks of the magnetic tape. That is to say, only ¼ of the data are assumed to be recorded in each track in the direction vertical to the picture.

As shown in the trace T3, first the data in the front half of the first track are reproduced by the magnetic head, then the data in the rear half of the third track are reproduced and then, by the running of the magnetic tape, the data in the front half of the last track (fourth track) of the first field are reproduced. Here if the reproduced data in the front half of each track are made data A and the reproduced data in the rear half are made B, the data A and B will be alternately reproduced.

As shown in trace T3, the next reproduced data are the data B in the rear half of the sixth track of the second field and then the data A in the front half of the seventh track. Thereafter, in the same manner, the data B in the rear half of the adjacent track and the data A in the front half are continuously reproduced. The reproduced state of these data is shown in Table 1, in which the number of the track is represented by No. 1, 2, etc.

TABLE 1

|  | First ¼ division | Second ¼ division | Third ¼ division | Fourth ¼ division |
|---|---|---|---|---|
| First Field | No. 1 A | No. 2 | No. 3 B | No. 4 A |
| Second Field | No. 5 | No. 6 B | No. 7 A | No. 8 |
| Third Field | No. 9 B | No. 10 A | No. 11 | No. 12 B |
| Fourth Field | No. 13 A | No. 14 | No. 15 B | No. 16 A |
| Fifth Field | No. 17 | No. 18 B | No. 19 A | No. 20 |
| Sixth Field | No. 21 B | No. 22 A | No. 23 | No. 24 B |

As shown in Table 1, the data corresponding to the ¼ part of the top of the picture are reproduced by the first track of the first field and the ninth track of the third field. Also, in the same manner, the data corresponding to the ¼ part that is second from the top of the picture are reproduced by the sixth and tenth tracks, the data corresponding to the ¼ part that is third from the top of the picture are reproduced by the third and seventh tracks and the data corresponding to the lowermost ¼ part of the picture are reproduced by the fourth and 12th tracks. That is to say, if it is utilized that the picture data are correlative, the picture of one field will be able to be reproduced by reproducing the data of the first to twelfth tracks of the first to third fields.

The conversion table 152 in FIG. 15 judges, on the basis of the output of the ID circuit 144, the macro-block to which belong the reproduced coded data, and controls the low region decoder 150 and low region buffer 153. That is to say, the low region component can be decoded in response to the position of the picture and the picture can be positively reproduced from the reproduced data.

The outputs of the low region buffer 153 and high region buffer 155 are returned to the data of the macro-block by the reverse quantizing circuit 156, reverse zigzag scanning circuit 157 and reverse DCT circuit 158, are further converted to interlaced signals by the field data making circuit 159 and are output. The color difference components Cb and Cr are converted to interlaced signals, are divided by the DeMUX 160 and are output.

The below mentioned Table 2 shows the reproduced state of the data in case the decoded data of one field are recorded in eight tracks of the magnetic tape.

Even in this case, as shown by the trace T3, when the first, fourth, seventh, tenth, ... tracks are traced, the data A in the front half will be reproduced and, when the third, sixth, ninth, twelfth, ... tracks are traced, the data B in the rear half will be reproduced. That is to say, as shown in Table 2, when the data of the first to third fields are reproduced, the reproduced data of the part of each ⅛ of the picture will be obtained. By reproducing the data of the first to 24th tracks, one picture can be displayed.

Figure 16:
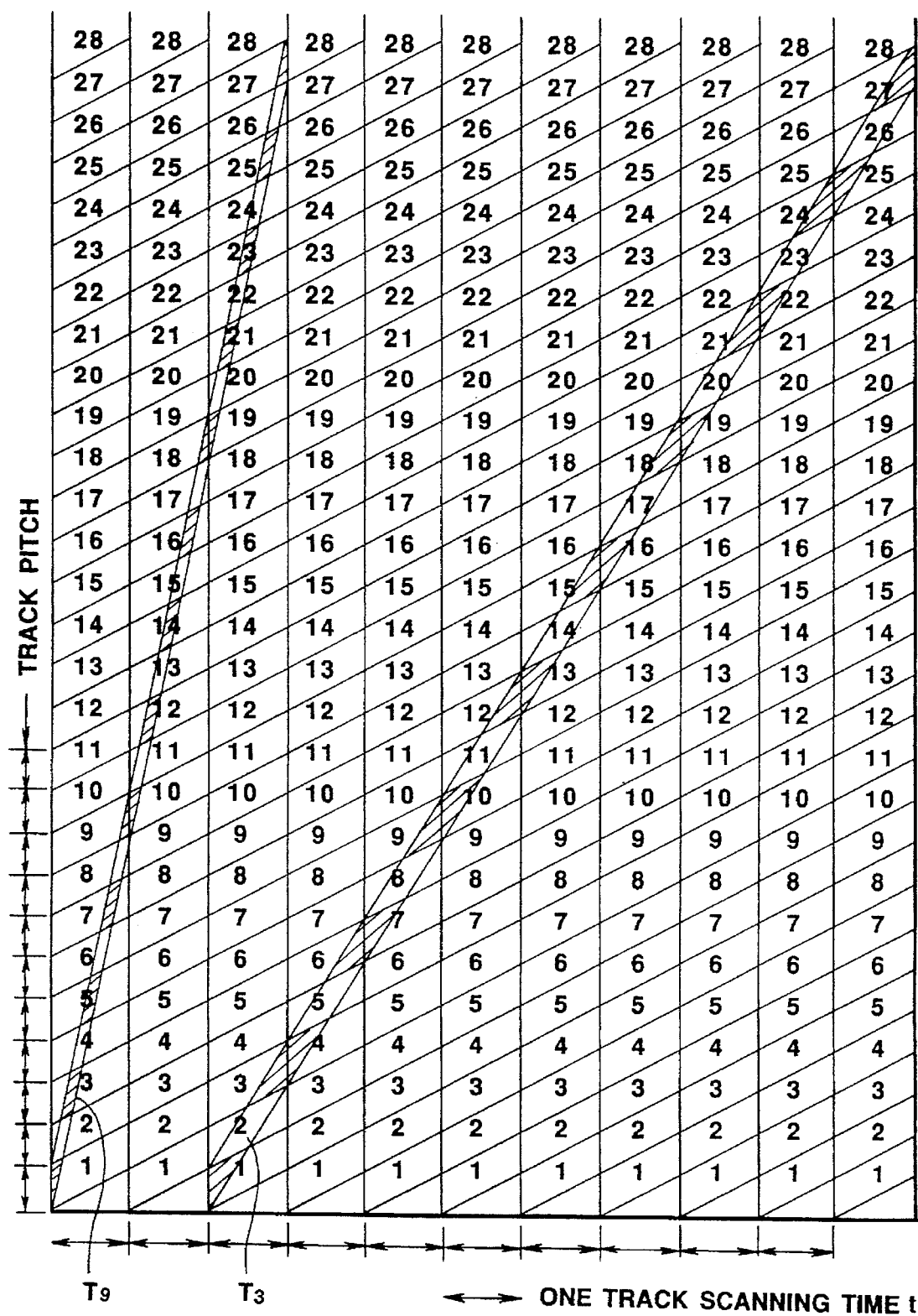
FIG. 16 is a tracing pattern diagram showing by a track pattern coordinate method the recorded tracks in the embodiment in FIG. 15.

Then, as shown by the trace T9 in FIG. 16, the 9-time speed reproduction is made. The below mentioned Table 3 shows the reproduced state of the data in case the coded data of one field are recorded in four tracks of the magnetic tape. In this case, the data of one track are reproduced as divided into eight parts and therefore, in the table, the numbers of 1 to 8 are attached to the reproduced data in the reproduced order.

TABLE 3

|  | First ¼ division | Second ¼ division | Third ¼ division | Fourth ¼ division |
|---|---|---|---|---|
| First Field | No, 1 1 | No. 2 | No. 3 2, 3 | No. 4 |
| Second Field | No. 5 5  4 | No. 6 | No. 7 6, 7 | No. 8 |
| Third Field | No. 9 8 | No. 10 1 | No. 11 | No. 12 2, 3 |
| Fourth Field | No. 13 | No. 14 5  4 | No. 15 | No. 16 6, 7 |
| Fifth Field | No. 17 | No. 18 8 | No. 19 1 | No. 20 |
| Sixth Field | No. 21 2, 3 | No. 22 | No. 23 5  4 | No. 24 |

As shown in this Table 3, when the first track and third track of the first field are reproduced, the data 1 and data 2 and 3 will be reproduced. In the same manner, when the fifth track and seventh track of the second field are reproduced, the data 4 and 5 and data 6 and 7 will be reproduced. When the ninth track, tenth track and twelfth track of the third field are reproduced, the data 8, data 1 and data 2 and 3 will be reproduced. Hereinafter, in the same manner, when the tracks are reproduced until the ninth field, in all the parts of ¼, the data 1 to 8 will be reproduced. Thus, when the first to 36th tracks are reproduced, the picture of one field will be able to be reproduced.

The below mentioned Table 4 shows the reproduced state of the data in case the coded data of one field are recorded in eight tracks of the magnetic tape.

TABLE 2

|  | First ⅛ division | Second ⅛ division | Third ⅛ division | Fourth ⅛ division | Fifth ⅛ division | Sixth ⅛ division | 7th ⅛ division | 8th ⅛ division |
|---|---|---|---|---|---|---|---|---|
| First Field | No. 1 A | No. 2 | No. 3 B | No. 4 A | No. 5 | No. 6 B | No. 7 A | No. 8 |
| Second Field | No. 9 B | No. 10 A | No. 11 | No. 12 B | No. 13 A | No. 14 | No. 15 B | No. 16 A |
| Third Field | No. 17 | No. 18 B | No. 19 A | No. 20 | No. 21 B | No. 22 A | No. 23 | No. 24 B |

TABLE 4

| | First ⅛ division | Second ⅛ division | Third ⅛ division | Fourth ⅛ division | Fifth ⅛ division | Sixth ⅛ division | 7th ⅛ division | 8th ⅛ division |
| --- | --- | --- | --- | --- | --- | --- | --- | --- |
| First Field | No. 1 1 | No. 2 | No. 3 2, 3 | No. 4 | No. 5 5 4 | No. 6 | No. 7 6, 7 | No. 8 |
| Second Field | No. 9 8 | No. 10 1 | No. 11 | No. 12 2, 3 | No. 13 | No. 14 5 4 | No. 15 | No. 16 6, 7 |
| Third Field | No. 17 | No. 18 8 | No. 19 1 | No. 20 | No. 21 2, 3 | No. 22 | No. 23 5 4 | No. 24 |

Even in this case, when the nine tracks are traced, the data 1 to 8 will be reproduced, the same as in the case of Table 3. Thus, even in the case of the Table 4, when the tracks in the nine fields are reproduced, all the parts of ⅛ will be reproduced. That is to say, when the first to 72nd tracks are reproduced and the low region components are arranged in response to the ID numbers, the picture of one field will be able to be reproduced.

Figure 17:
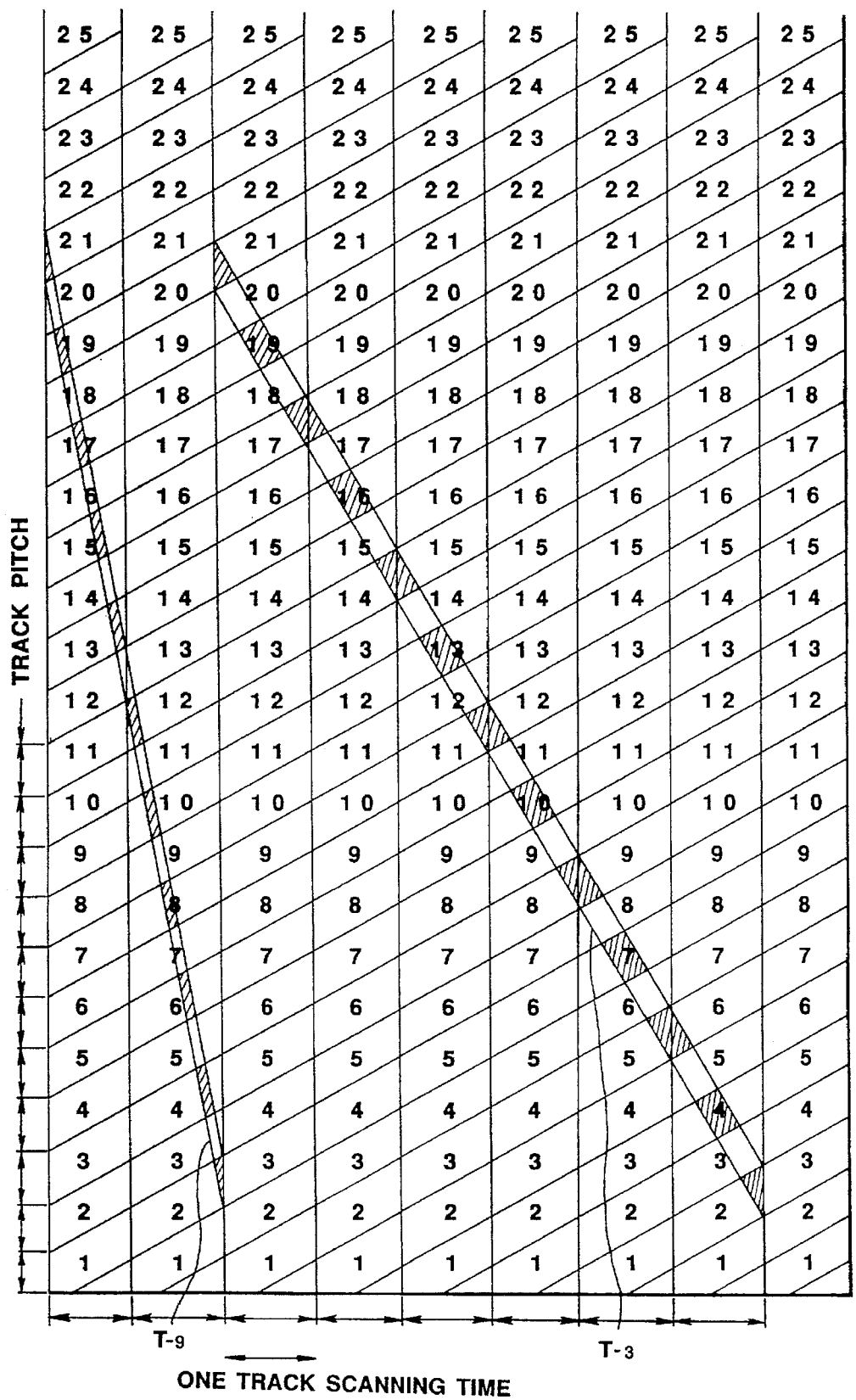
FIG. 17 is a tracing pattern diagram showing by a track pattern coordinate method the recorded tracks in the embodiment in FIG. 15.

Next, the -3-time speed reproduction (reverse direction high speed reproduction) shown in the trace T-3 in FIG. 17 is made. The below mentioned Table 5 shows the reproduced state of the data in case the coded data of one field are recorded in four tracks of the magnetic tape. In this case, one track is reproduced as divided into four parts and, in the table, the numbers 1 to 4 are attached in the reproduced order.

TABLE 5

| | First ¼ division | Second ¼ division | Third ¼ division | Fourth ¼ division |
| --- | --- | --- | --- | --- |
| nth Field | No. 21 1 | No. 20 | No. 19 2, 3 | No. 18 1 |
| (n-1)th Field | No. 17 4 | No. 16 2, 3 | No. 15 1 | No. 14 |
| (n-2)th Field | No. 13 2, 3 | No. 12 1 | No. 11 4 | No. 10 2, 3 |
| (n-3)th Field | No. 9 1 | No. 8 4 | No. 7 2, 3 | No. 6 1 |
| (n-4)th Field | No. 5 4 | No. 4 2, 3 | No. 3 1 | No. 2 4 |
| (n-5)th Field | No. 1 2, 3 | No. 0 1 | No. -1 4 | No. -2 2, 3 |

As shown in the trace T-3 in FIG. 17, first, the 21st track of the nth field is traced and the data 1 are reproduced. Then, data 2 and 3 of the 19th track and data 1 of the 18th track are reproduced successively. In the next (n–1)th field, the data 4 of the 17th track, data 2 and 3 of the 16th track, data 1 of the 15th track and data 4 of the 14th track are successively reproduced. Thereafter, the reproduction is made in the same manner. As shown in the above mentioned Table 5, when the three fields of the (n–1)th field to (n–3)th field are reproduced, the reproduced data 1, 2, 3 and 4 will be obtained in the respective parts of ¼ on the picture. Thus, even in the case of the -3-time speed reproduction, when the low region components are coded, the picture will be able to be reproduced.

The below mentioned Table 6 shows the reproduced state of the data in case the coded data of one field are recorded in eight tracks of the magnetic tape.

TABLE 6

| | First ⅛ division | Second ⅛ division | Third ⅛ division | Fourth ⅛ division | Fifth ⅛ division | Sixth ⅛ division | 7th ⅛ division | 8th ⅛ division |
| --- | --- | --- | --- | --- | --- | --- | --- | --- |
| n | No. 21 1 | No. 20 | No. 19 2, 3 | No. 18 1 | No. 17 4 | No. 16 2, 3 | No. 15 1 | No. 14 4 |
| n-1 | No. 13 2, 3 | No. 12 1 | No. 11 4 | No. 10 2, 3 | No. 9 1 | No. 8 4 | No. 7 2, 3 | No. 6 1 |
| n-2 | No. 5 4 | No. 4 2, 3 | No. 3 1 | No. 2 4 | No. 1 2, 3 | No. 0 1 | No. -1 4 | No. -2 2, 3 |

As shown in the Table 6, even in this case, the relation between the track number in which the data are reproduced and the number of the reproduced data is the same as in the case of Table 5. Therefore, even in this case, when the data for three fields, or 24 tracks, are traced, the picture of one field will be able to be reproduced.

Then, the -9-time speed reproduction (reverse direction high speed reproduction) shown in the trace T-9 in FIG. 17 is made. The below mentioned Table 7 shows the reproduced state of the data in case the coded data for one field are recorded in four tracks of the magnetic tape. By the way, in this case, as shown in the trace T-9, one track is reproduced and divided into 10 parts and therefore, in the table, numbers 1 to 10 are attached in the reproduced order.

TABLE 7

| | First ¼ division | Second ¼ division | Third ¼ division | Fourth ¼ division |
| --- | --- | --- | --- | --- |
| nth Field | No. 21 1 | No. 20 | No. 19 2, 3 | No. 18 |
| (n-1)th Field | No. 17 4, 5 | No. 16 | No. 15 6, 7 | No. 14 |
| (n-2)th Field | No. 13 8, 9 | No. 12 1 | No. 11 10 | No. 10 2, 3 |
| (n-3)th Field | No. 9 | No. 8 4, 5 | No. 7 | No. 6 6, 7 |

TABLE 7-continued

|  | First ¼ division | Second ¼ division | Third ¼ division | Fourth ¼ division |
|---|---|---|---|---|
| (n-4)th Field | No. 5 | No. 4 8, 9 | No. 3 1 | No. 2 10 |
| (n-5)th Field | No. 1 2, 3 | No. 0 | No. −1 4, 5 | No. −2 |

As shown in this Table 7, the data 2, 3, 4, 5, 6, 7, 8, 9, 1 and 10 are reproduced by the trace of the 19th to 11th tracks and are repeatedly reproduced at the intervals of the later 9 tracks. That is to say, when, the remaining 18 tracks second track are reproduced, in each part of ¼ of the picture, the data 1 to 10 will be reproduced. That is to say, by reproducing 36 tracks of 9 fields, the picture of one field can be reproduced.

The below mentioned Table 8 shows the reproduced state of the data in case the coded data for one field are recorded in 8 tracks of the magnetic tape.

TABLE 8

|  | First ⅛ division | Second ⅛ division | Third ⅛ division | Fourth ⅛ division | Fifth ⅛ division | Sixth ⅛ division | 7th ⅛ division | 8th ⅛ division |
|---|---|---|---|---|---|---|---|---|
| n | No, 21 1 | No. 20 2, 3 | No. 19 1 | No. 18 4, 5 | No. 17 2, 3 | No. 16 1 | No. 15 4 | No. 14 |
| n-1 | No. 13 8, 9 | No. 12 1 | No. 11 10 | No. 10 2, 3 | No. 9 | No. 8 4 | No. 7 2, 3 | No. 6 1 |
| n-2 | No. 5 4 | No. 4 8, 9 | No. 3 1 | No. 2 10 | No. 1 2, 3 | No. 0 1 | No. −1 4 | No. −2 2, 3 |

As shown in Table 8, even in this case, the relation between the track number, in which the data are reproduced, and the number of the reproduced data is the same as in the case of Table 7. Therefore, even in this case, when the data for nine fields, that is, 72 tracks are traced, the picture of one field will be able to be reproduced.

By the way, the speed multiplying number $N_{BA}$, at the time of the high speed reproduction and the number $N_t$ of the tracks required to record the data for one field must be set to have no other greatest common divisor than 1. For example, the data for one field are recorded in six tracks and the 3-time speed reproduction is to be made. This is to divide the above mentioned Table 1 by 6. The data to be reproduced by the first to sixth tracks of the first field are respectively data A, none, data B, data A, none and data B. The reproduced data of the seventh to 12th tracks of the next second field are also the same. That is to say, the parts not reproduced are always generated and the picture can not be reproduced. Therefore, as described above, the greatest common divisor of the number $N_t$ of the tracks dividing the data of one field and the speed multiplying number $N_{BA}$ must be set to be only 1.

Thus, in this embodiment, the low region component of the quantized output is arranged in a predetermined position of the synchronous block and is recorded at fixed intervals in each track of the magnetic tape. As the macro-block data are variable length data, in typical speed multiplying reproduction or the like, the recorded data will be incontinuously reproduced and errors will be generated. However, as the current recording is made at fixed intervals in each track in the synchronous block, when a plurality of fields are reproduced, the coded data of the low region component corresponding to one field will be obtained and the macro-block to which belongs the reproduced low region component will be able to be judged. Thereby, the low region component, which can represent at least the basic picture, can be decoded and the picture can be reproduced. Thus, when the variable length coding is adopted, the bit rate will be sufficiently reduced and, without adding the address to each macro-block, even at the time of the special reproduction, the reproduced picture will be able to be displayed.

Figure 18:
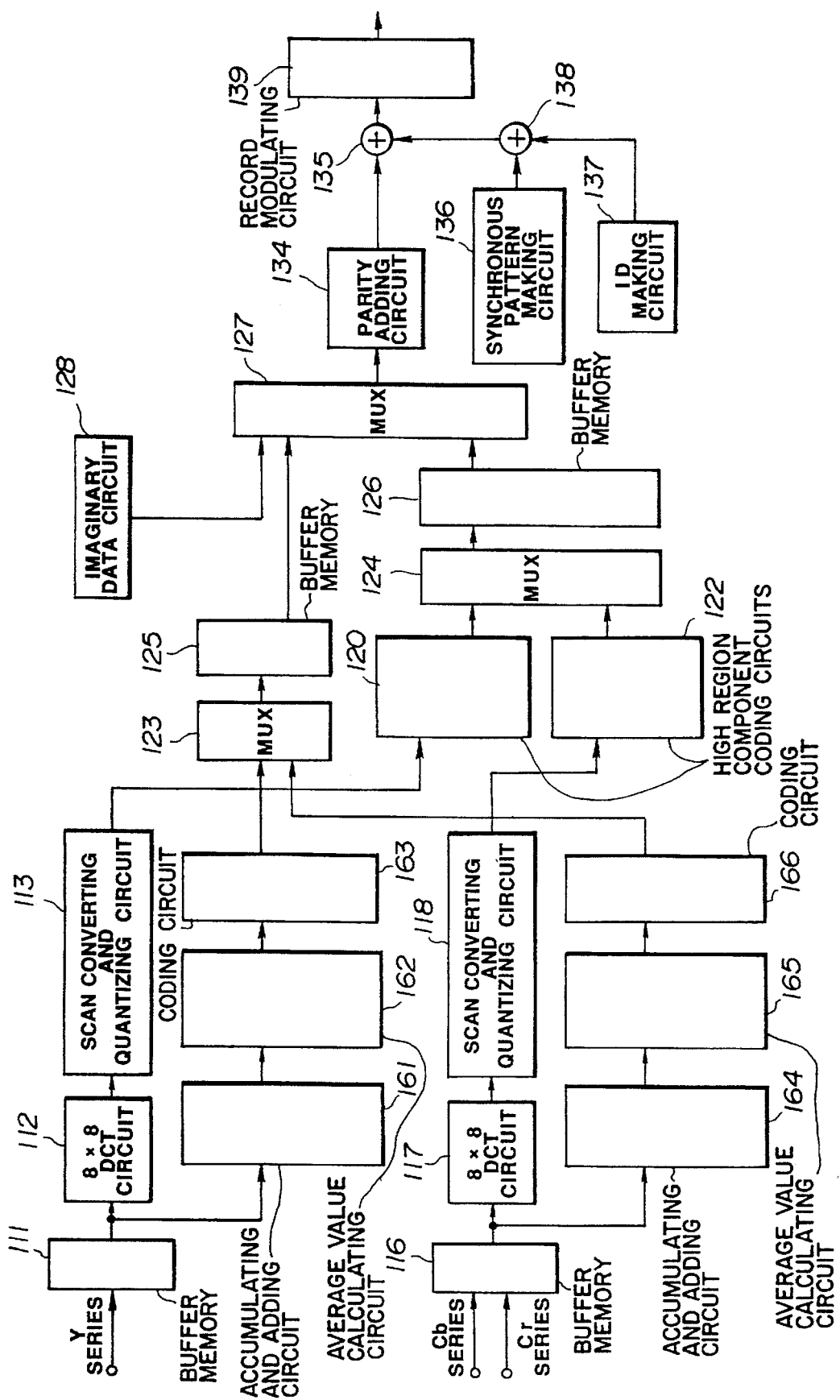
FIG. 18 is a block diagram showing another embodiment of the present invention.

FIG. 18 is a block diagram showing another embodiment on the coding side of the present invention. in FIG. 18, the same components as in FIG. 4 shall bear the same reference numerals and shall not be explained here.

This embodiment is different from the embodiment in FIG. 4 in respect that accumulating and adding circuits 161 and 164, average value calculating circuits 162 and 165 and coding circuits 163 and 166 are provided in place of the low region component coding circuits 119 and 121 in FIG. 4. Block data of 8×8 pixels from the respective buffer memories 111 and 116 are given to the accumulating and adding circuits 161 and 164 which add the data of 8×8 pixels. The average value calculating circuits 162 and 165 respectively determine the average values of the outputs of the accumulating and adding circuits 161 and 164 and output them to the coding circuits 163 and 166 which make a coding process (for example, a predictive coding process) different from the high region component on the respective input data and output the data to the MUX 123.

In this embodiment, the same data as the low region components (direct current components) of the conversion coefficients of the respective DCT circuits 112 and 116 are output from the average value calculating circuits 162 and 165. The coding circuits 163 and 166, for example, predictively code the input low region component data and output them to the MUX 123. The other operations are the same as in the embodiment in FIG. 4. Thus, the low region component coding rout can be also separately provided.

Figure 19:
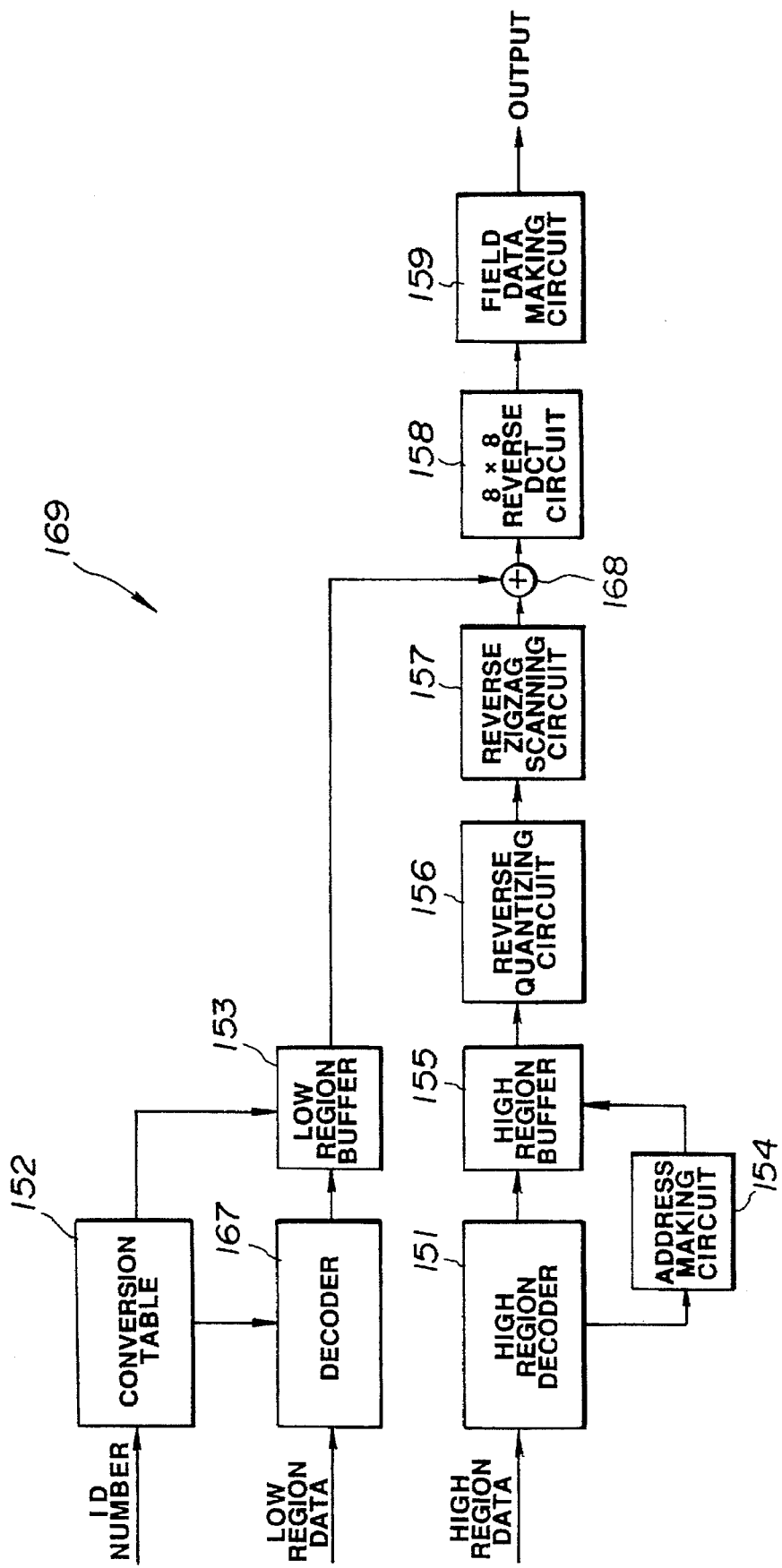
FIG. 19 is a block diagram showing another embodiment of the present invention.

FIG. 19 is a block diagram showing a luminance signal processing system of another embodiment on the decoding side of the present invention. In FIG. 19, the same components as in FIG. 15 shall bear the same reference numerals and shall not be explained here. In this embodiment, the coded data by the embodiment in FIG. 18 are decoded. By the way, the formation of the color difference signal processing system is the same as of the luminance signal processing system and shall not be illustrated here.

In this embodiment, a luminance signal processing system 169 is adopted in place of the luminance signal processing system 148. The low region component of the coded data is given to a decoder 167 which makes a decoding process reverse to the coding process in FIG. 18 on the output of the conversion table 152 and output it to the low region buffer 153. The output of the low region buffer 153 is given to the adder 168 which adds the decoded output of the high region component from the reverse zigzag scanning circuit 157 and the output of the low region buffer 153 and gives them to the reverse DCT circuit 158.

In the thus formed embodiment, the predictively coded low region component is decoded by the decoder 167 and is memorized in the low region buffer 153 which is controlled by the conversion table 152, outputs the memorized data at a timing corresponding to the ID number and gives them to the adder 168. The adder 168 adds the data of the low region component and high region component and outputs them. The other operations are the same as in FIG. 15.

Thus, different coding processes can be also made on the high region component and low region component.

Figure 20:
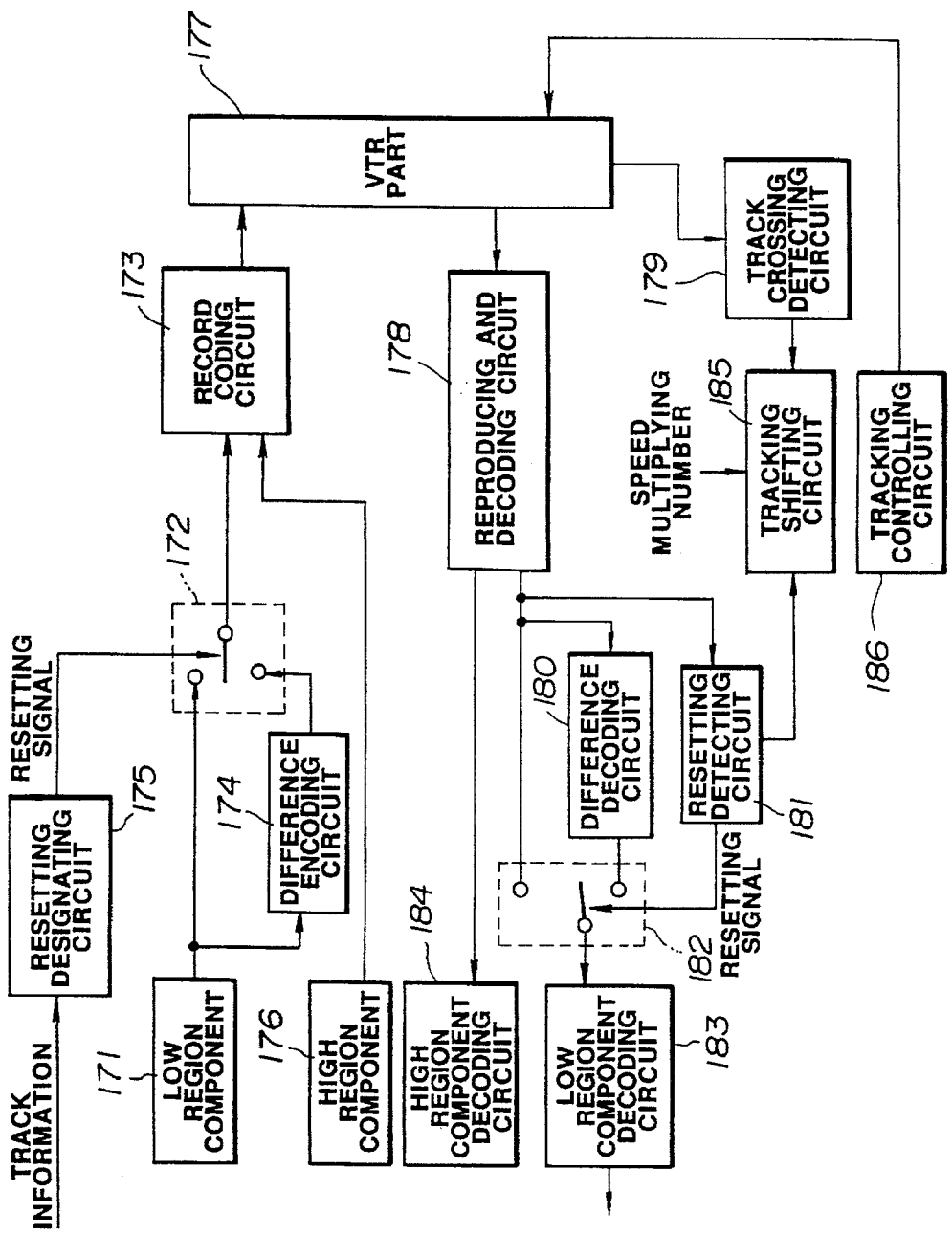
FIG. 20 is a block diagram showing another embodiment of the present invention.

FIG. 20 is a block diagram showing the high efficiency coding recording and reproducing apparatus of another embodiment of the present invention. In the embodiment in FIG. 4, the low region component of the coded block data is recorded as it is. On the other hand, in this embodiment, the low region component is coded in the difference and is recorded.

The low region component 171 is a low region component of the block data having had the scan converted and processed to be quantized after the DCT process and is given to the selecting circuit 172 and to the difference coding circuit 174 which codes in the difference the input low region component. That is to say, the low region component which is a PCM signal is converted to a DCM signal which is output to the selecting circuit 172. The track information showing the information of the beginning end and ending end of the track is given to the resetting designating circuit 172 which gives the selecting circuit 172 a resetting signal based on the track information. That is to say, the resetting designating circuit 175 generates a resetting signal at a period based on such track information as the speed multiplying number and also generates continuously m (m≦1) resetting signals at the beginning end of the track.

The selecting circuit 172 selects the low region component 171 at the timing of the resetting signal, outputs it as a starting block and selects the output of the difference coding circuit 174 at another timing. The output of the selecting circuit 172 is given to the record coding circuit 173. The record coding circuit 173 adds a multiplex parity. synchronous signal and ID signal to the high region component 176 of the block data converted in the scan and processed to be quantized after the DCT process and to the low region component from the selecting circuit 172, further modulates the record or the like and outputs them to the VTR part 177 which records the data in a magnetic tape not illustrated and reproduces the recorded data in the magnetic tape.

The reproduced data from the VTR part 177 are given to the reproduction decoding circuit 178 and track crossing detecting circuit 179. The reproduction decoding circuit 178 makes the record demodulation, synchronous detection, TBC correction and error correction of the reproduced data and outputs the data to the high region component decoding circuit 184, difference decoding circuit 180, resetting detecting circuit 181 and selecting circuit 182. The high region component decoding circuit 184 decodes and outputs the high region component of the block data. The difference decoding circuit 180 decodes the difference code by the difference coding circuit 174 on the coding side and outputs it to the selecting circuit 182.

The resetting detecting circuit 181 detects that the starting block has been output from the reproduction decoding circuit 178 and outputs a resetting signal to the selecting circuit 182 which will select the output of the reproduction decoding circuit 178 and will give it to the low region component decoding circuit 183 only in case the resetting signal is input but will select the output of the difference decoding circuit 180 and will give it to the low region component decoding circuit 183 in the other case. The low region component decoding circuit 183 decodes the low region component of the block data and outputs it by making the time axis coincide with the high region component decoding circuit 184.

On the other hand, the track crossing detecting circuit 179 detects the timing when the video head crosses (moves to the adjacent track) from the variation of the envelope of the reproduced data and gives the track crossing detecting pulse to the tracking shifting circuit 185 which is given the data of the speed multiplying number and the resetting signal from the resetting detecting circuit 181 and outputs to the tracking controlling circuit 186 the signal for designating the optimum tracing position. The tracking controlling circuit 186 regulates the tracking of the VTR part 177 on the basis of the output of the tracking shifting circuit 185.

Figure 21:
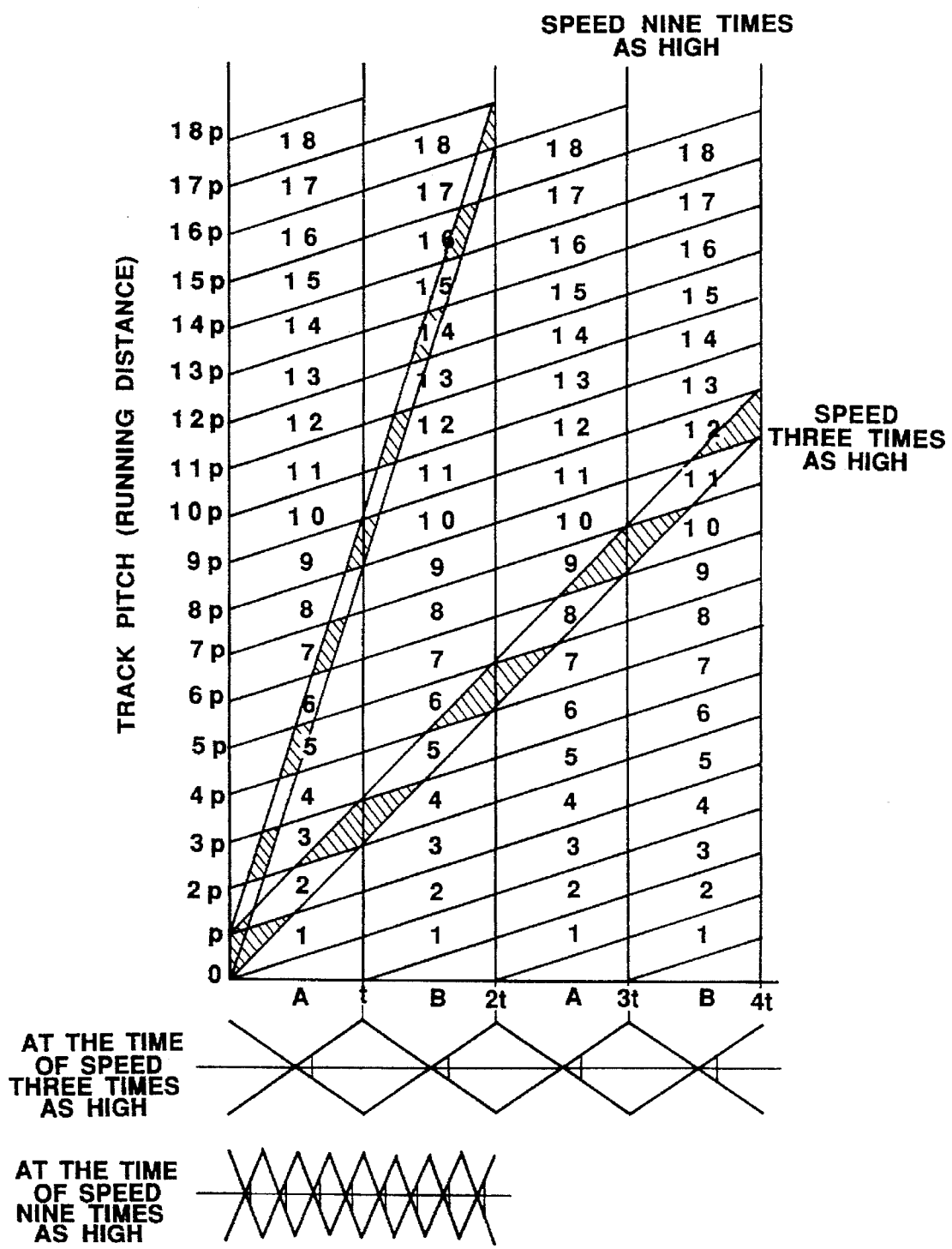
FIG. 21 is a tracing pattern diagram showing by a track pattern coordinate method the recorded tracks in the embodiment in FIG. 20.

The operation of the thus formed embodiment shall be explained in the following with reference to FIGS. 21, 22, and 23. FIG. 21 is a trace pattern diagram for explaining the operation of the multiplied speed reproduction by a track pattern coordinate method. In FIG. 21, reproduced envelopes at the time of the 3-time-speed reproduction and 9-time-speed reproduction are schematically shown.

In the speed multiplying reproduction, as the video head traces the track across it, in the crossing timing, the envelope will be the smallest and, as shown in FIG. 21, the envelope will be abacus bead-like. By the way, in response to the tracking state, the zero cross point of the envelope moves to and fro. Also, depending on the recording track width and reproducing track width, the waveheight value of the reproduced envelope varies.

Now, in the embodiments in FIGS. 4 and 15, the special reproduction is made possible by recording the low region coded data at fixed intervals on the tracks. Here, in order to further reduce the bit rate, the low region component is predictively coded. In this case, it is necessary to record a so-called start block which can be decoded with only single block data without utilizing the correlation. However, as described above, heretofore, at the time of the special reproduction, the start block has not been always able to be reproduced. On the other hand, in this embodiment, the start block is recorded and reproduced at a period corresponding to the maximum speed multiplying number in the VTR part 177. For example, at the time of the 3-time-speed reproduction, one (each hatched part at the time of the 3-time-speed reproduction in FIG. 21) start block is recorded at each track scanning time and, at the time of the 9-time-speed reproduction, 4 (each hatched part at the time of the 9-time-speed reproduction in FIG. 21) start blocks are recorded at one track scanning time. By the way, by considering that the trace is started at the track beginning end, the number of the start blocks may be increased by one each.

In FIG. 20, the low region component 171 is a start block which can be decoded by reproducing only a single block. The data of this start block are given to the difference coding circuit to be coded in the difference. The selecting circuit 172 is controlled by the resetting signal and outputs to the record coding circuit 173 the data of the start block at a timing based on the track information and speed multiplying number.

Figure 22:
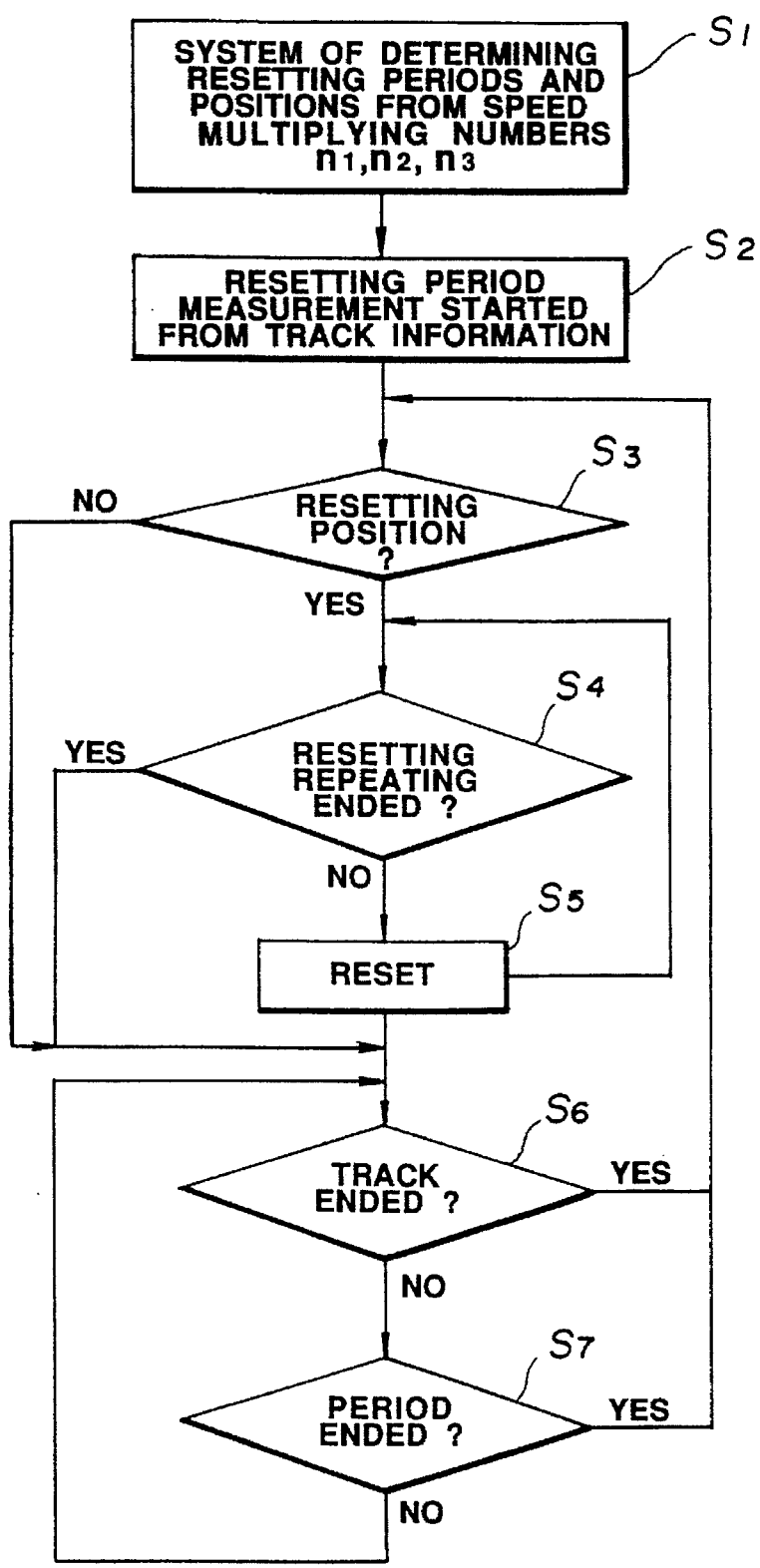
FIG. 22 is a flow chart for explaining the operation of the embodiment in FIG. 20.

FIG. 22 is a flow chart for explaining the operation of the resetting designating circuit 175 which calculates the recording period (resetting period) of the start block on the basis of setting the speed multiplying number of the VTR part 177 in the step S1 in FIG. 22. In this case, in consideration of reproducing (interchangeably reproducing) the data recorded by the other VTR, u (u≧1) start blocks are continuously recorded. Further, in consideration of the influence of the tracking shift, at the track beginning end, m (m≧u≧1) start blocks are continuously recorded. In the step S1, the resetting designating circuit 175 sets these repeated resetting number (start block number) u and track beginning end repeating number m.

When the trace by the video head is then started, in the step S2, the measurement of the resetting period will be started. That is to say, the track information showing the beginning end and ending end of the track is input into the resetting designating circuit 175 and, in the step S3, whether the block is to be reset or not is judged. In the step S4, whether the start block has been selected u times or not is judged. Also, in the step S6, whether the ending end of the track or not is judged. In the step S7, whether the end of the resetting period or not is judged. By these steps S3 to S6, the resetting designating circuit 175 selects the resetting start block u times and sets the resetting at each fixed period until the track ending end.

The data of the low region component from the selecting circuit 172 are given to the record coding circuit, are multiplexed with the high region component, are given to the VTR part 177 and are recorded in a magnetic tape not illustrated. Thus, for example, by the timing shown by the thick line part just after the zero cross point of the envelope in FIG. 17, the data of the low region component of the start block are recorded.

The data of the thus recorded start block may be reproduced by the timing in which the reproduced envelope becomes smallest depending on the tracking state or, on the contrary, may be reproduced by the timing in which the envelope becomes largest. In order to elevate the decoding rate of the data, it is necessary to trace the start block near the track crossing point (the timing of the smallest envelope). For this purpose, at the time of the reproduction, the tracking is controlled.

That is to say, the reproduced output from the VTR part 177 is decoded by the reproducing and decoding circuit 178 and is also given to the track crossing detecting circuit 179 and the track crossing timing of the video head is detected. Of the output of the reproducing and coding circuit 178, the high region component is decoded by the high region component decoding circuit 184 and the low region component is given to the selecting circuit 182, difference decoding circuit 181 and resetting detecting circuit 181. When it is detected that the data of the start block have been reproduced by the resetting detecting circuit 181, the selecting circuit 182 will give the output of the reproducing and decoding circuit 178 to the low region component decoding circuit 183 by the resetting signal and will decode it. In the other timing, the selecting circuit 182 gives to the low region component decoding circuit 183 the block data decoded in the difference by the difference decoding circuit 180.

On the other hand, the track crossing pulse from the track crossing detecting circuit 179 is given to the tracking shifting circuit 185 to which are also given the data of the speed multiplying number and resetting signal. The optimum tracking position is determined by the operation shown in the flow chart in FIG. 23.

Figure 23:
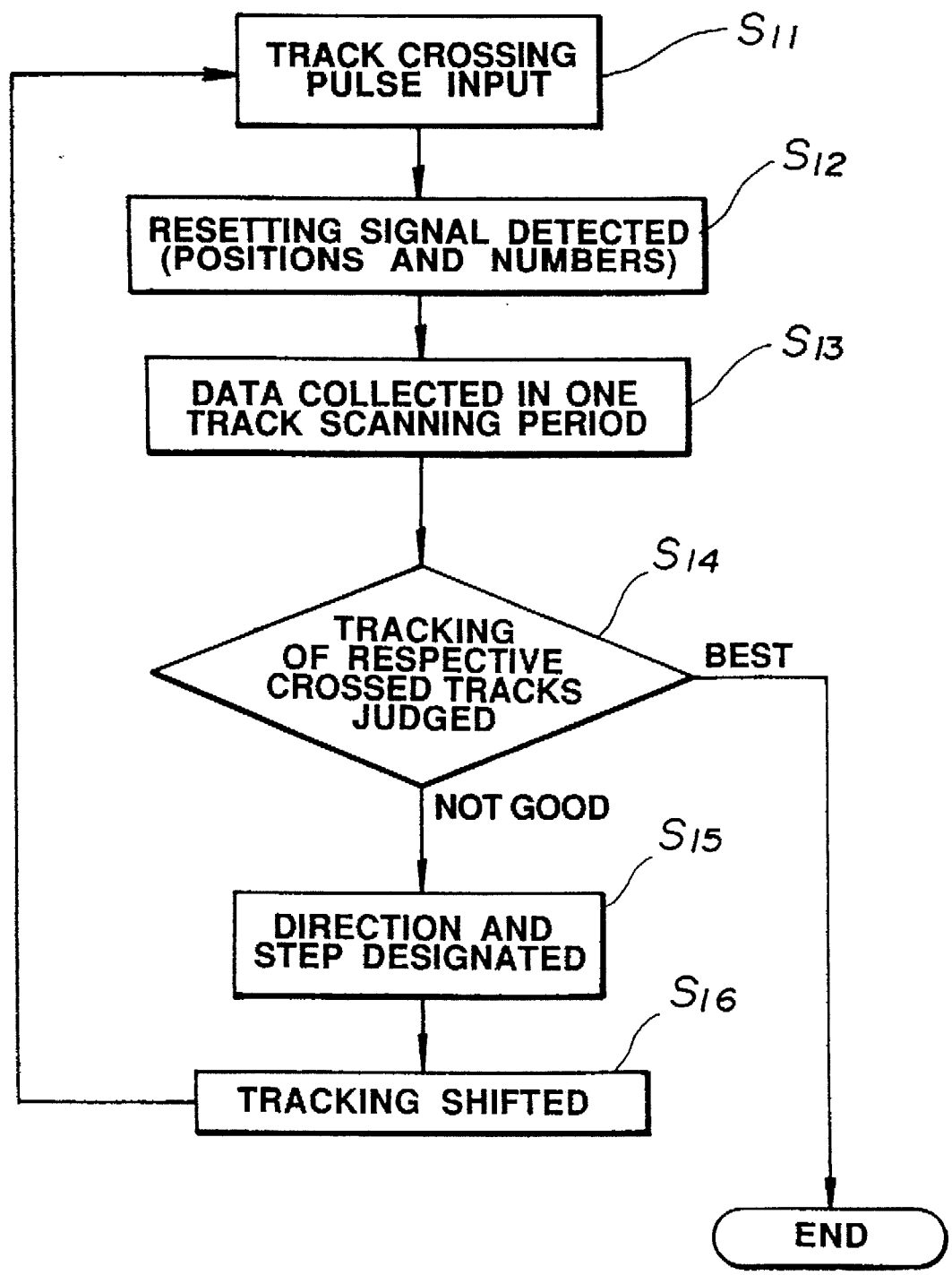
FIG. 23 is a flow chart for explaining the operation of the embodiment in FIG. 20.
Figure 24:
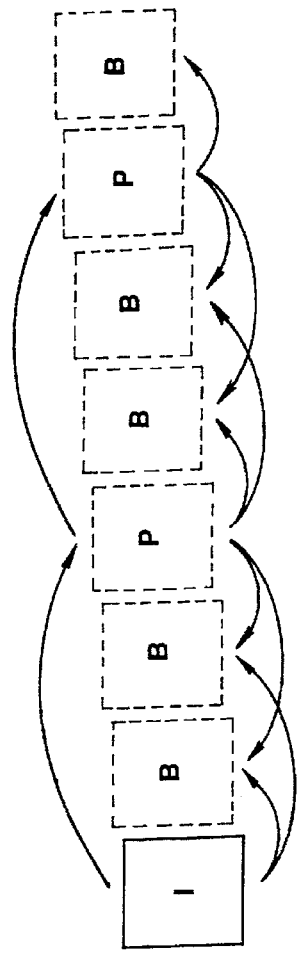
FIG. 24 is an explanatory diagram for explaining an MPEG coding system.
Figure 25:
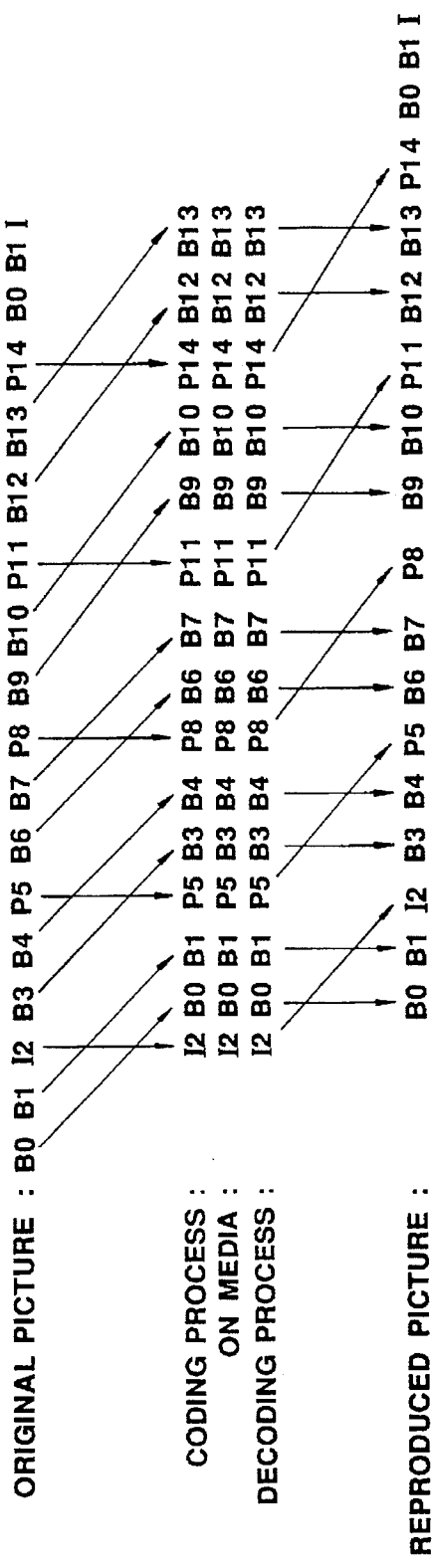
FIG. 25 is an explanatory diagram showing the order of image data by the encoding process, arrangement on the medium and decoding process in the MPEG encoding system.
Figure 26:
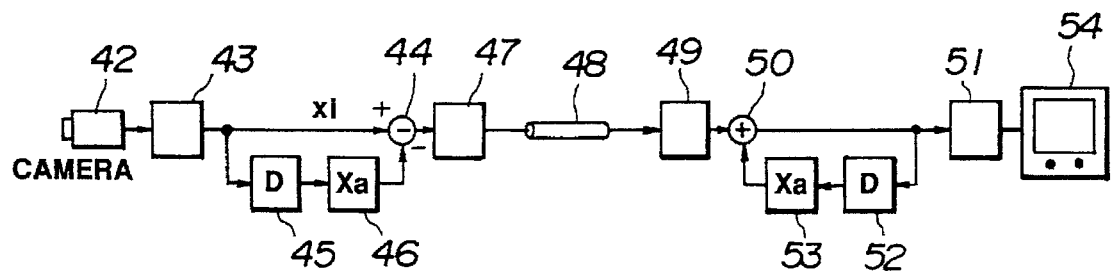
FIG. 26 and FIG. 27 are a circuit diagram showing a predictive coder and decoder.
Figure 27:
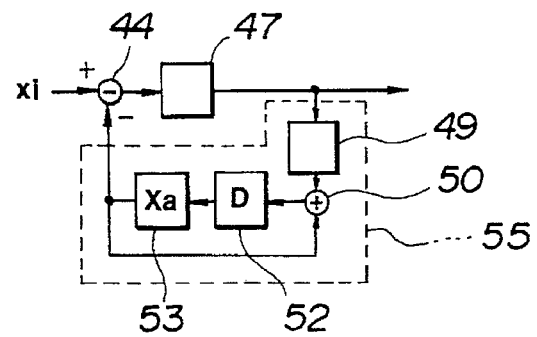
Figure 28:
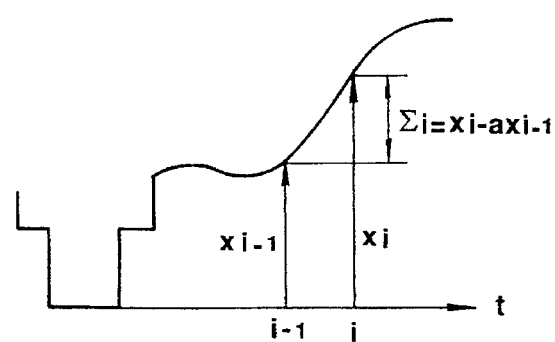
FIG. 28 is a waveform diagram for explaining the predictive coding of a television signal.
Figure 29:
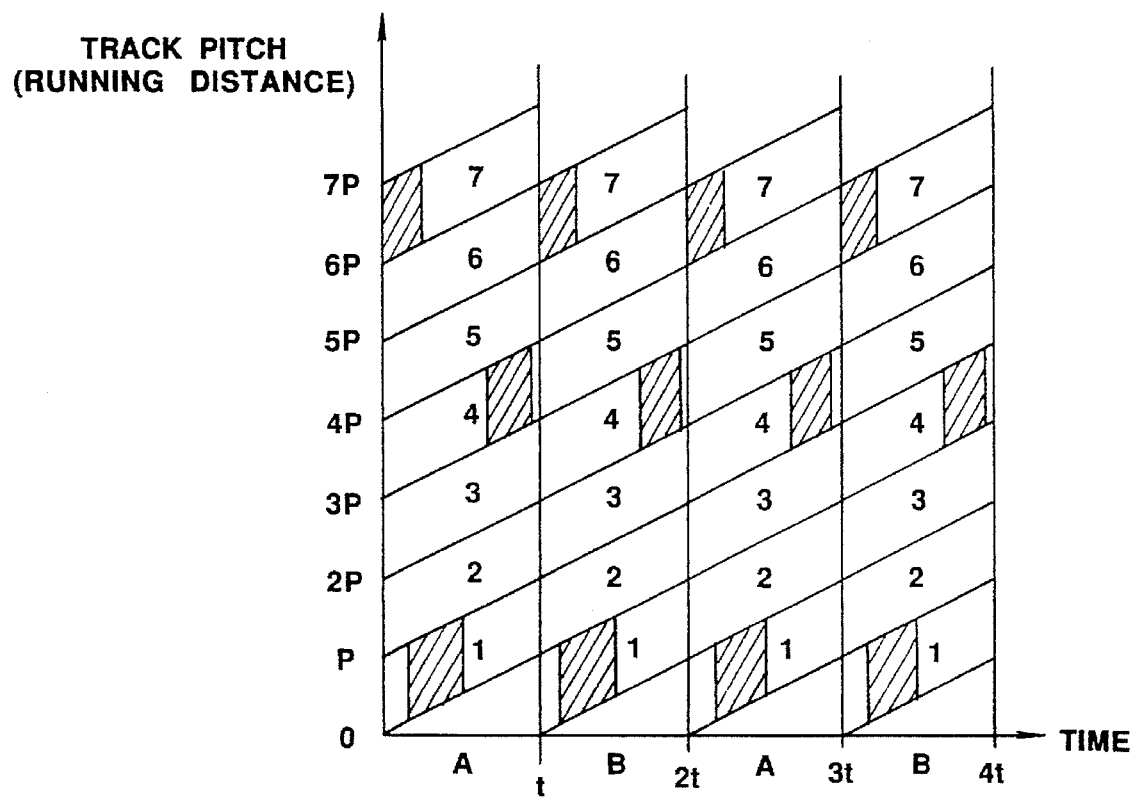
FIG. 29 is a tracing pattern diagram showing by a track pattern coordinate method the recording tracks in the case that the MPEG coding system is applied to a DAT or VTR.
Figure 30:
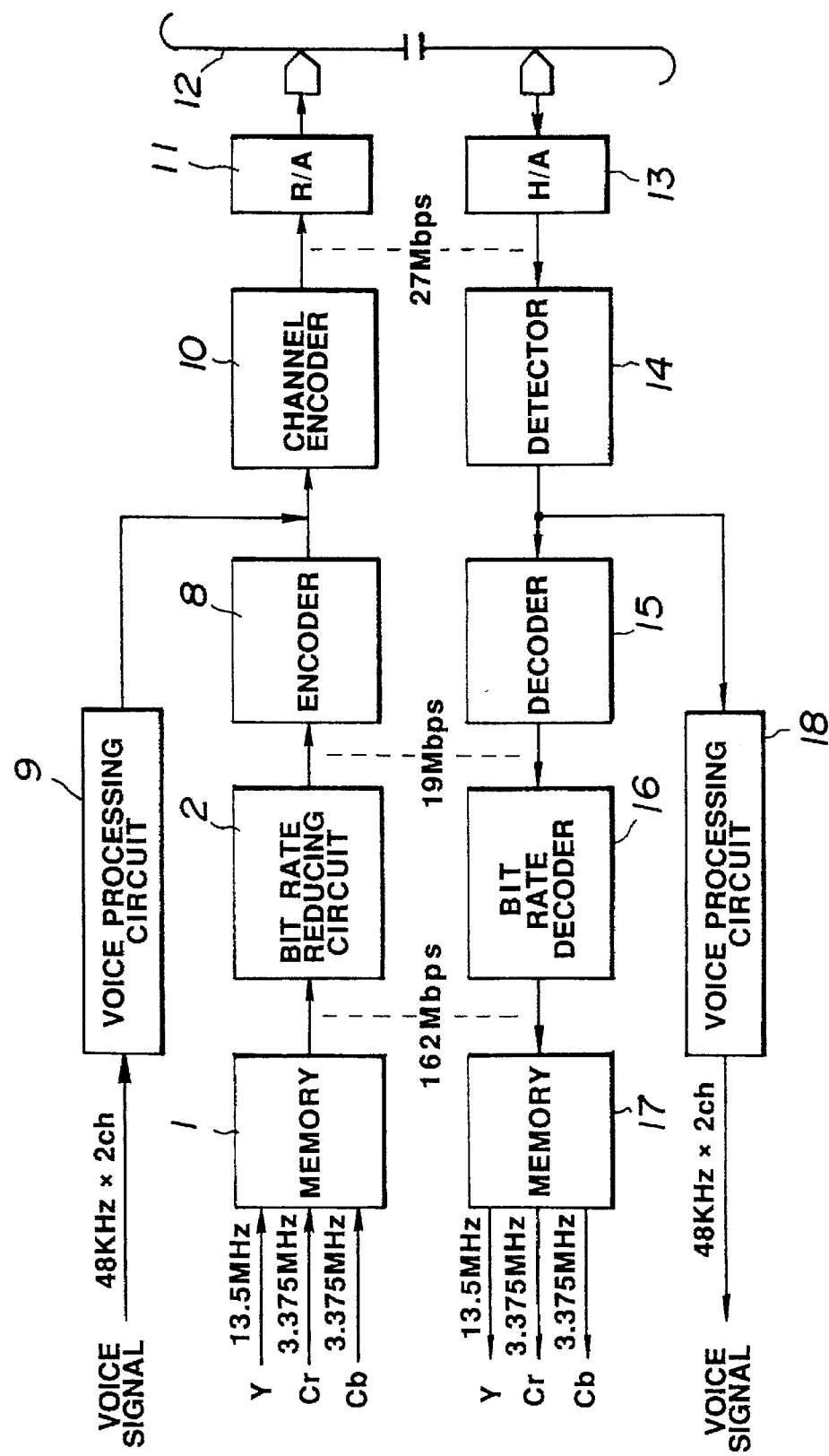
FIG. 30 is a block diagram showing a conventional high efficiency coding recording and reproducing apparatus.
Figure 31:
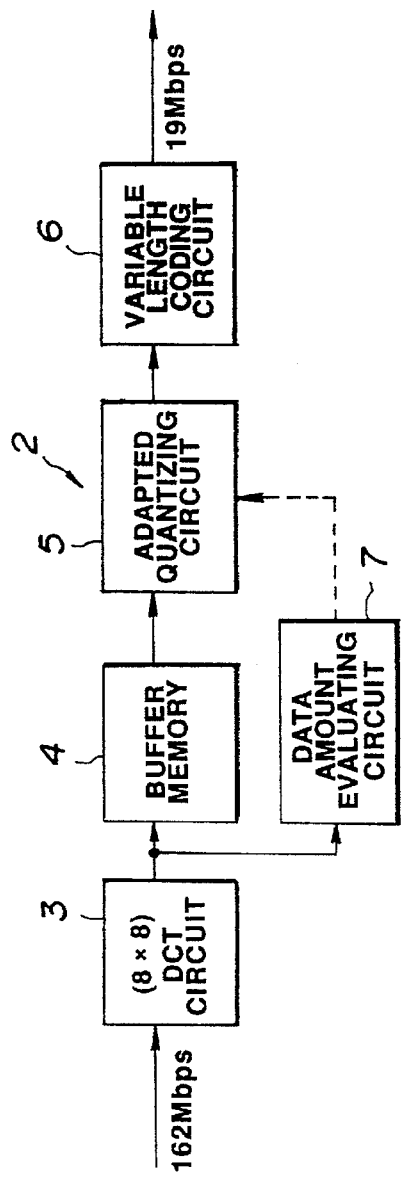
FIG. 31 is a block diagram showing a concrete formation of a bit rate reducing circuit in FIG. 30.
Figure 32:
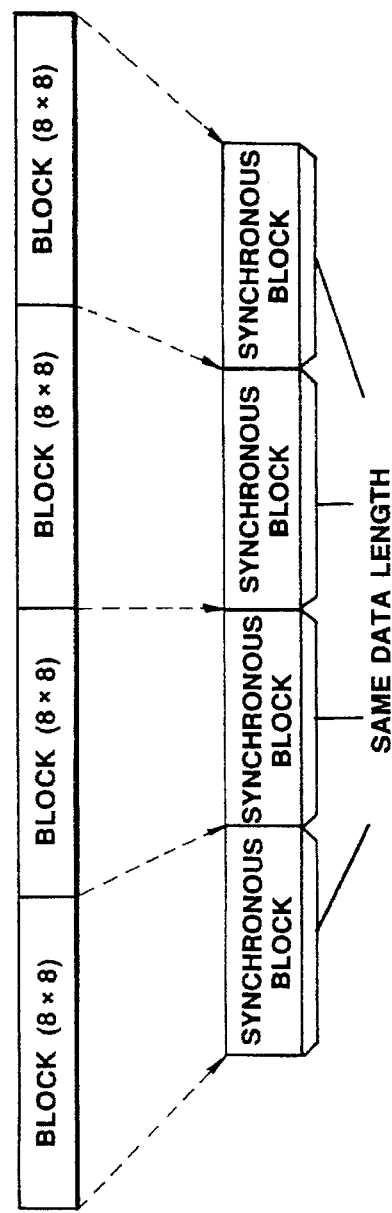
FIG. 32 is an explanatory diagram showing a data recording format in FIG. 30.
Figure 33:
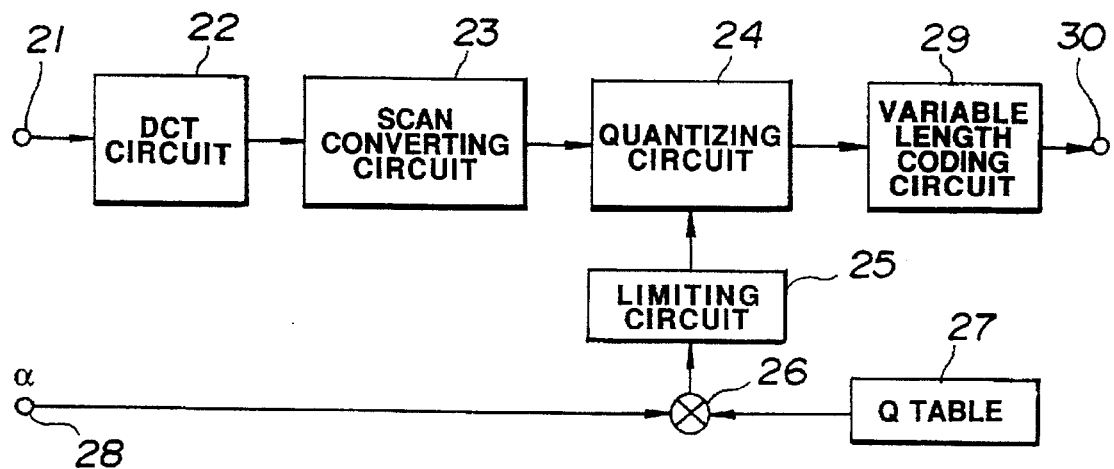
FIG. 33 is a block diagram for explaining a conventional example.
Figure 34:
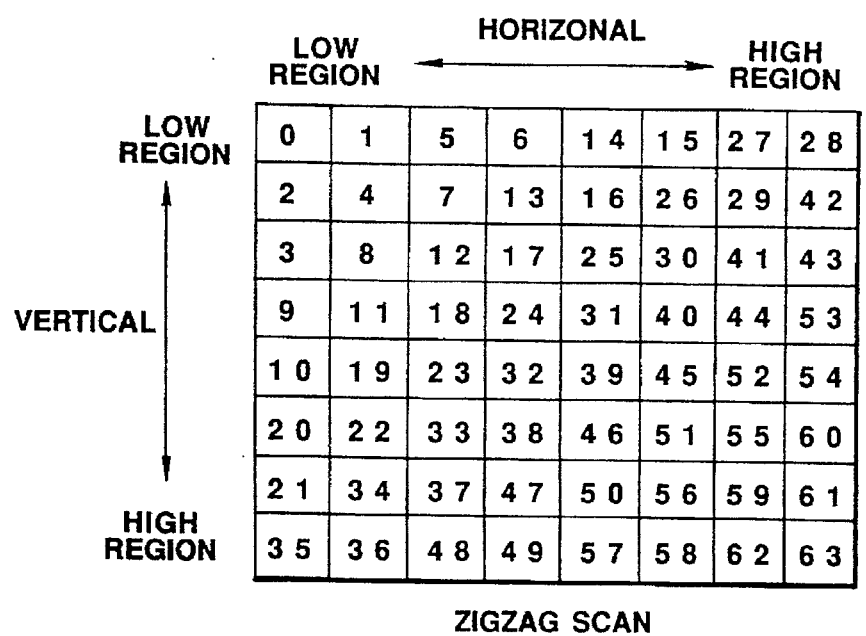
FIG. 34 is an explanatory diagram for explaining a DCT conversion coefficient.
Figure 35:
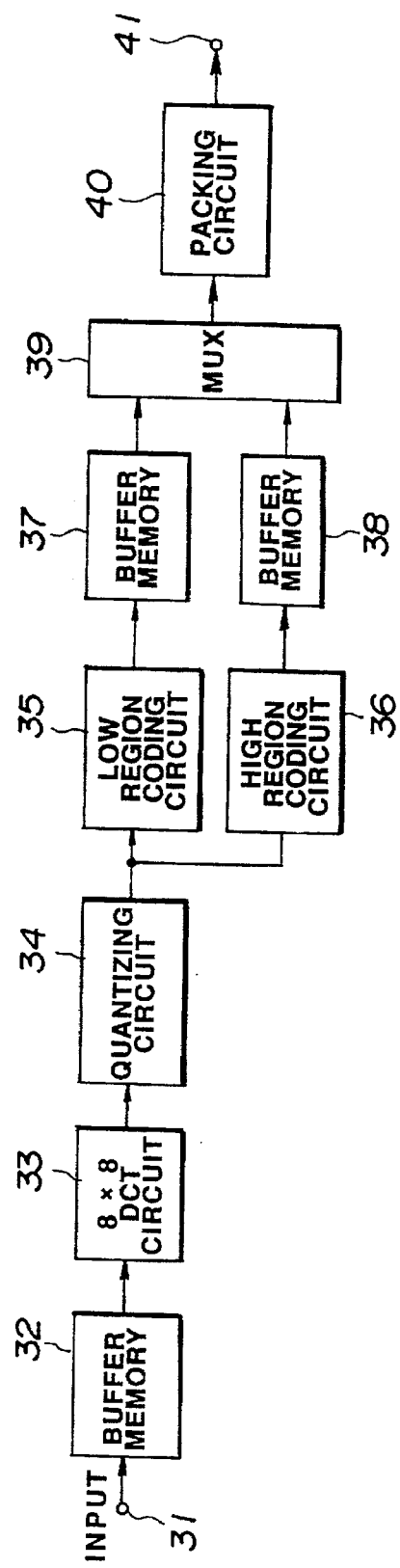
FIG. 35 is a block diagram showing a conventional high efficiency coding recording and reproducing apparatus.
Figure 36:
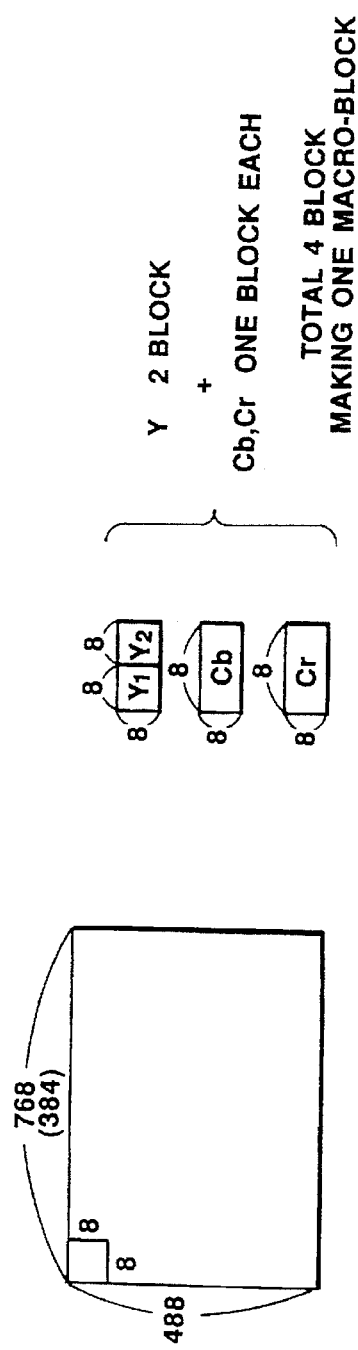
FIG. 36 is an explanatory diagram for explaining a macro-block.
Figure 42:
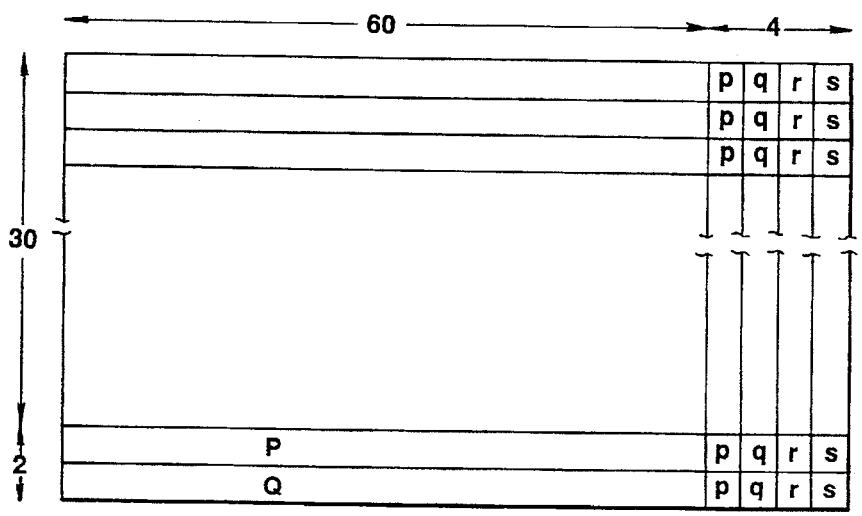
FIG. 42 is an explanatory diagram for explaining error correcting codes.
Figure 43:
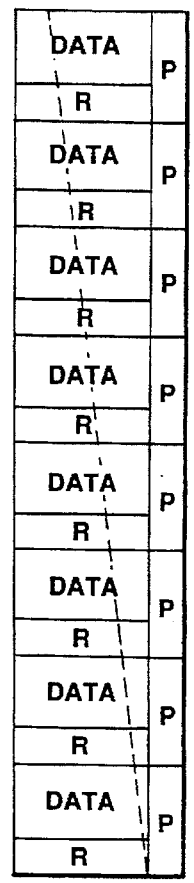
FIG. 43 is an explanatory diagram for explaining error correcting codes.

That is to say, when the track crossing pulse is input in the step S11 in FIG. 23, in the next step S12, the tracking shifting circuit 185 will detect the positions and number of the resetting signals from the resetting detecting circuit 181 so that it may be judged whether the block data will be positively reproduced or not whenever the video head crosses the track. In the next step S13, when one track scanning period ends, the detected results, positions and number of all the resetting signals will be detected. In the step S14, the tracking state is judged from the detected results.

In case the tracking is judged to be the best, the process will end but, in case it is not judged to be good, the process will shift to the next step S15 in which the tracking adjusting direction and variation amount are designated to the tracking controlling circuit 186 which shifts the tracking in the step S16 to obtain the optimum tracking position.

Thus, in this embodiment, the low region component is coded in the difference, the data of the start block of the low region component are recorded at a predetermined period on the basis of the track information in response to the speed multiplying number and, at the time of the reproduction, the optimum tracking position will be determined from the track crossing pulse and resetting signal to positively reproduce the data of the start block. Thereby, such special reproduction as the speed multiplying reproduction can be made and, by the difference coding, the bit rate can be further reduced.

In the present invention, it is apparent that working modes different in a wide range can be formed on the basis of the present invention without deviating from the spirit and scope of the invention. The present invention is not restricted by its specific working mode except being limited by the appended claims.

What is claimed is:

1. An apparatus for reproducing image signals, which are digitally stored on a magnetic tape, in an efficient manner, comprising:

conversion coding means for converting a digital image signal to predetermined blocks of coded data in a specified frequency range;

separating means for separating said coded data into a low region component and a high region component, wherein said low region component corresponds to a direct current component of said coding means and said high region component corresponds to a non-direct current component of said coding means;

tape recording and reproducing means, for either recording said coded data signal onto said magnetic tape, or reading said magnetic tape and reproducing said coded data signal, which is stored thereon; and recording-signal arranging means for time divisionally multiplexing said low region component and said high region component of said coded data together and providing said multiplexed data to said tape recording and reproducing means; and wherein said recording-signal arranging means positions an image plane, comprised of coded data blocks, so as to have a one-to-one correspondence with a position on said magnetic tape, with said low region component being recorded onto a predetermined position on said magnetic tape so as to have a one to one correspondence with each of said image plane positions, and, while recording said low region component onto a predetermined position of said magnetic tape in correspondence with said image plane, arranges said low region component of said coded data to a predetermined position on a synchronous block that corresponds to a synchronous signal.

2. An apparatus for reproducing image signals according to claim 1, wherein said time divisionally multiplexed low region component and high region component are output from said recording-signal arranging means in a synchronous block unit based on said synchronous signal.

3. An apparatus for reproducing image signals according to claim 1, wherein said low region component and said high region component are variably coded before being output by said operating means.

4. An apparatus for reproducing image signals according to claim 1, wherein said recording signal arranging means adds an ID number to every synchronized block unit so as to be indicative of that block unit, with said low region component of said coded data being arranged with respect to said ID number.

5. An apparatus for reproducing image signals according to claim 1, wherein said recording-signal arranging means determines a number of blocks of said low region component, prior to being recorded, based on a number of synchronized block units recorded on a single track of said magnetic tape, a number of predetermined blocks which form a single image plane, and a number of tracks used to record data of said single image plane.

6. An apparatus for reproducing digitally stored image signals in an efficient manner, comprising:

conversion coding means for converting a digital image signal to predetermined blocks of coded data in a specified frequency range;

separating means for separating said coded data into a low region component and a high region component, wherein said low region component corresponds to a direct current component of said coding means and said high region component corresponds to a non-direct current component of said coding means;

low region coding means for performing predetermined coding upon said low region component of said coded data;

high region coding means for performing predetermined coding upon said high region of said coded data;

recording signal arranging means for forming a signal consisting of an output of said low region coding means and an output of said high region coding means time divisionally multiplexed together, said signal being output in synchronized block units in correlation with a synchronizing signal, with said output of said low region coding means being arranged at a predetermined position in said synchronized block units;

recording means for recording said signal from said recording signal arranging means, said signal being recorded onto a track of a magnetic tape so that said synchronized block units are arranged at predetermined intervals;

reproducing means for reproducing the data recorded onto said magnetic tape, said reproducing means capable of proceeding at a normal operating speed or a high operating speed, said high operating speed being equivalent to said normal operating speed multiplied by a speed multiplying coefficient;

synchronizing signal detecting means for detecting the reproduced data for said synchronizing signal corresponding to said synchronized block units;

high region decoding means for decoding the high region component of said coded signal in said reproduced data;

low region decoding means for decoding the low region component of said coded signal in said reproduced data;

output order conversion means for changing an output order of said low region decoding means on the basis of an output from said synchronizing signal detecting means; and decoding means for converting an output from said high region decoding means and an output from said output order conversion means to data based on a time axis, thereby reproducing an image plane.

7. An apparatus for reproducing digitally stored image signals according to claim 6, wherein a number of tracks of said magnetic tape that record a single image plane and the speed multiplying coefficient used to determine the operating speed of the reproducing means are set such that their greatest common divisor is equal to 1.

8. An apparatus for reproducing digitally stored image signals according to claim 6, wherein said decoding means uses only the low region component from said output order conversion means to reproduce an image when said reproducing means is performing a high speed reproduction.

9. An apparatus for reproducing digitally stored image signals according to any one of claims 6, 7 or 8, wherein, to obtain coded data for the predetermined blocks within a single image plane, a coding process performed by said low region coding means is different from the coding process performed by said high region coding means, said low region coding means performing difference coding processing.

10. An apparatus for reproducing digitally stored image signals in an efficient manner, comprising:

conversion coding means for converting a digital image signal to predetermined blocks of coded data in a specified frequency range;

low region component coding means for performing predetermined coding with respect to a low region component of a conversion coefficient from said conversion coding means, wherein said low region component corresponds to a direct current component of said conversion coefficient used to code data;

high region component coding means for performing predetermined coding with respect to a high region component of a conversion coefficient from said conversion coding means, wherein said high region component corresponds to a non-direct current component of said conversion coefficient used to code data;

difference coding means for difference coding an output from said low region component coding means;

recording means for selecting either an output from said difference coding means or an output from said low region component coding means, said selected output being recorded onto a recording medium along with an output from said high region component coding means;

reproducing means for reproducing the data recorded onto said recording medium, said reproducing means capable of proceeding at a normal operating speed or a high operating speed, said high operating speed being equivalent to said normal operating speed multiplied by a speed multiplying coefficient;

selection designating means for causing said recording means to select the output from said low region component coding means when, on the basis of said speed multiplying coefficient, an envelope of said reproduced data possesses a value within a predetermined range, otherwise the output from said difference coding means is selected;

high region component decoding means for decoding a high region component of said reproduced data;

detecting means for determining whether said reproduced data contains low region component data that has been difference coded;

difference decoding means for decoding, on the basis of said detecting means, the low region component that has been difference coded;

low region component decoding means for decoding, on the basis of said detecting means, the low region component that has not been difference coded;

track crossing detecting means for scanning the recorded medium and determining locations of tracks upon said recorded medium, and outputting a detecting pulse for every located track; and tracking control means for determining an optimum scanning position of said recorded medium on the basis of output from said detecting means and the detecting pulses from said track crossing detecting means, and adjusting the scanning performed during said reproducing means in response to the speed multiplying coefficient.

11. An apparatus for reproducing digitally stored image signals according to claim 10, wherein said selection designating means causes said recording means to select the output from said low region component coding means more frequently than the output from said difference coding means when recording near a track crossing point, thereby providing that the reproducing means will reproduce the output from said low region component coding means when operating near said track crossing point.

* * * * *